United States Patent
Kakinami et al.

(10) Patent No.: US 7,379,564 B2
(45) Date of Patent: May 27, 2008

(54) MOVABLE BODY CIRCUMSTANCE MONITORING APPARATUS

(75) Inventors: Toshiaki Kakinami, Aichi-ken (JP); Shuji Yamamoto, Aichi-ken (JP)

(73) Assignee: Aisin Seiki Kabushiki Kaisha, Aichi-pref (JP)

( * ) Notice: Subject to any disclaimer, the term of this patent is extended or adjusted under 35 U.S.C. 154(b) by 750 days.

(21) Appl. No.: 10/738,097

(22) Filed: Dec. 18, 2003

(65) Prior Publication Data
US 2005/0163343 A1 Jul. 28, 2005

(30) Foreign Application Priority Data
Dec. 18, 2002 (JP) ............... 2002-366007

(51) Int. Cl.
*G06K 9/00* (2006.01)
*G01C 22/00* (2006.01)

(52) U.S. Cl. ............. 382/104; 382/103; 382/153; 348/116; 348/148; 701/28; 340/932.2

(58) Field of Classification Search ........ 382/103, 382/104, 153; 340/435, 436, 932.2; 701/1, 701/28, 36, 41, 200; 348/116, 148
See application file for complete search history.

(56) References Cited

U.S. PATENT DOCUMENTS

| | | | |
|---|---|---|---|
| 5,638,116 A * | 6/1997 | Shimoura et al. | 348/118 |
| 6,172,601 B1 * | 1/2001 | Wada et al. | 340/436 |
| 6,483,429 B1 * | 11/2002 | Yasui et al. | 340/435 |
| 6,531,959 B1 * | 3/2003 | Nagaoka et al. | 340/435 |
| 7,110,021 B2 * | 9/2006 | Nobori et al. | 348/148 |
| 2001/0026317 A1 | 10/2001 | Kakinami et al. | |
| 2005/0195383 A1 * | 9/2005 | Breed et al. | 356/4.01 |

FOREIGN PATENT DOCUMENTS

| | | |
|---|---|---|
| DE | 101 09 680 A1 | 10/2001 |
| EP | 1 005 234 A2 | 5/2000 |
| EP | 1 065 642 A2 | 1/2001 |
| EP | 1 094 337 A2 | 4/2001 |
| EP | 1 403 137 A1 | 3/2004 |
| JP | 6-129833 A | 5/1994 |
| JP | 10-117340 A | 5/1998 |
| JP | 2000-161915 A | 6/2000 |

(Continued)

OTHER PUBLICATIONS

Multiple view Geometry, Richard Hartley and Andrew Zisserman, CVPR Jun. 1999.*

(Continued)

*Primary Examiner*—Aaron Carter
(74) *Attorney, Agent, or Firm*—Sughrue Mion Pllc.

(57) ABSTRACT

A movable body circumstance monitoring apparatus includes element for capturing an image of a surrounding of a movable body depending upon movement of the movable body, deriving at least four feature points in a specified flat at the image, tracking the feature points in response to movement of the movable body from a first state to a second state, and specifying relative position and posture of the element for capturing the image at the first and second states in response to first flat coordinates of the feature points at the first state and second flat coordinates of the feature points at the second state based upon a tracking result.

14 Claims, 18 Drawing Sheets

FOREIGN PATENT DOCUMENTS

| | | |
|---|---|---|
| JP | 2001-266160 A | 9/2001 |
| WO | WO 01/25054 A1 | 4/2001 |

OTHER PUBLICATIONS

Japanese Patent Laid-Open Publication No. 2001-187553.

Koichiro Deguchi, ed., "2. Solve a Sterophonic Mechanism" in Information Processing, vol. 37, No. 7, Japan, 1996.

Kenichi Kanatani, ed., "Three-Dimensional Shape Reconstruction by a Stereoscope Vision" in Mathematics of Spatial Data, vol. 1. Japan: Asakura Inc., 1995, pp. 161-162.

Koichiro Deguchi, ed., "3. Dimension of Motion Images", in Information Processing, vol. 37, No. 8, Japan, 1996.

J. Borenstein, L. Feng, eds., "Gyrodometry: A New Method for Combining Data from Gyros Odometry in Mobile Robots" in Proceedings of the IEEE International Conference on Robotics and Automation. U.S., Apr. 22-28, 1996, pp. 423-428.

Richard Harley, Andrew Zisserman eds., "1.3 Projective Transformations" (p. 11-) and "7.3 Action of an Projective Camera on Quadrics" (p. 190-) in Multiple View Geometry in Computer Vision. U.K.: Cambridge University Press, 2000.

Oliver Faugeras, ed., 3.4 Calibrating Cameras: in Three-Dimensional Computer Vision: A Geometric Viewpoint. U.S.: MIT press, 1993, pp. 51-58.

\* cited by examiner

Image V1 at a First State (First Camera Position)

Image V2 at a Second State (Second Camera Position)

MOVABLE BODY CIRCUMSTANCE MONITORING APPARATUS

CROSS REFERENCE TO RELATED APPLICATIONS

This application is based on and claims priority under 35 U.S.C. § 119 with respect to Japanese Patent Application 2002-366007, filed on Dec. 18, 2002, the entire contents of which are incorporated herein by reference.

FIELD OF THE INVENTION

This invention generally relates to a movable body circumstance monitoring apparatus optimized for monitoring circumstance of a movable body. More particularly, this invention pertains to a movable body circumstance monitoring apparatus optimized for monitoring an environment around a movable body and for displaying a view from the movable body at an intended position as an image. For example, the movable body circumstance monitoring apparatus is preferably utilized for monitoring an environment around a vehicle as the movable body and for displaying an object or an obstacle at a time like vehicle parking, when needed

BACKGROUND OF THE INVENTION

Conventionally have been known and commercially available various types of apparatus for monitoring circumstance around a vehicle. One of the apparatus includes a camera mounted, for example, on a vehicle rear portion, and a monitor mounted near a driver's seat and for displaying a view captured by the camera as an image. Japanese Patent Laid-Open Publication No. 2001-187553 (hereinafter, referred to as a patent document 1) discloses a parking support system. The parking support system includes an image capturing unit, which captures different surroundings of a moving vehicle at first and second points as first and second images which are produced in time series, a stereoscopic object specifying unit, which detects and specifies a stereoscopic object in each first and second image, a vehicle position calculating unit, which calculates a vehicle moving data from the first point to the second point, and a stereoscopic object distance calculating unit, which calculates a distance between the vehicle and the stereoscopic object based upon positions of the stereoscopic object in the first and second images and the vehicle moving data. The parking support system including the above structure generates a third image to be transmitted to a vehicle driver based upon the images by the image capturing unit and the distance calculated by the stereoscopic object distance calculating unit. The image capturing unit is represented by a single camera. Therefore, a distance towards the stereoscopic object imaged in the first and second images can be calculated in accordance with principle of triangulation.

In an image processing technical field, has been known a conventional technique which reconstructs a three-dimensional shape by use of two cameras. For example, a nonpatent publication 1 (Koichiro Deguchi, ed., "2. Solve a Stereophonic Mechanism" in Information Processing, vol. 37, no. 7. Japan, 1996) describes gauging a stereoscopic object shape by a stereoscope method. A related portion in the nonpatent publication 1 holds followings as its prerequisites, to determine a position of a corresponding point in the space: features of the respective images shot by the two cameras, e.g., focal lengths of the two camera lenses, image centers thereof, pixel size thereof; positions and postures of the two cameras; and correspondence between the two images.

Likewise, a nonpatent publication 2 (Kenichi Kanatani, ed., "Three-Dimensional Shape Reconstruction by a Stereoscope Vision" in Mathematics of Spatial Data, vol. 1. Japan: Asakura Inc, 1995, 161-162) describes a method of calculating a three-dimensional shape of a substance in accordance with principle of triangulation based upon a corresponding relationship between the images shot by two cameras. The principal of triangulation has been described as one of the most fundamental methods of deriving three-dimensional information from images obtained by the two cameras, for the purpose of robot controlling.

Further, a nonpatent publication 3 (Koichiro Deguchi, ed., "3. Operation of Motion Images" in Information Processing, vol. 37, no. 8. Japan, 1996) describes that a three-dimensional shape of an object can be reconstructed based upon motion images in accordance with the same principle as the above-described stereoscope method. Especially, when the motion images are sequentially produced, the motion of the object can be tracked. Therefore, the sequential motion images are considered to be more preferable compared with two images in regard to deriving corresponding points.

Further, a nonpatent publication 4 (J. Borenstein, L. Feng, eds., "Gyrodometry: A New Method for Combining Data from Gyros Odometry in Mobile Robots" in Proceedings of the IEEE International Conference on Robotics and Automation. U.S., Apr. 22-28, 1996, 423-428) presents a very simple, yet very effective method of combining measurements from a gyro with measurements from wheel encoders (odometry).

Still further, a nonpatent publication 5 (Richard Hartley, Andrew Zisserman eds., "1.3 Projective Transformations" (p.11-) and "7.3 Action of a Projective Camera on Quadrics" (p.190-) in Multiple View Geometry in Computer Vision. U.K.: Cambridge University Press, 2000) presents that calibration between images at two different points, both of which include an identical object, can be represented by homography H.

A nonpatent publication 6 (Oliver Faugeras, ed., "3.4 Calibrating Cameras" in Three-Dimensional Computer Vision: A Geometric Viewpoint. U.S.: MIT Press, 1993, 51-58) presents that internal and external camera parameters can be calculated by analyzing homography matrix (perspective projection matrix).

The above-described patent document 1 discloses a method of calculating the distance toward the stereoscopic object in the first and second images. The parking support system is not required to have a gauging sensor, and yet is provided with the stereoscopic object specifying unit, which detects and specifies the stereoscopic object shot in the images, the vehicle position calculating unit, which calculates the vehicle moving data, and the stereoscopic object distance calculating unit, which calculates the distance between the vehicle and the stereoscopic object. More specifically, an image A shot while the vehicle 1 is at a position a is calibrated to an image as if it were shot while the vehicle 1 was at a position b, wherein an image C can be calculated. Therefore, a distance between the vehicle and the stereoscopic object can be geometrically calculated based upon a variation between the two images and the vehicle moving data.

Further, according to the above-described patent document 1, a steering angle sensor and a vehicle wheel speed sensor with a pulse counter are required to compute a vehicle moving distance and a vehicle moving direction. However, these sensors may raise following problems. First of all, the vehicle wheel speed sensor may not achieve sufficient detecting precision when the vehicle drives at a creeping speed. Therefore, output from right and left vehicle wheel speed sensors may differ due to imbalance of each wheel diameter. Further, an effective wheel diameter in response to load and an effective wheel base may not be determined precisely. Secondarily, there is a zone in which the steering angle sensor and turning radius are not nonlinearly related. Further, a vehicle movement is slow to respond relative to change of a steering wheel turning angle. Still further, the vehicle forward or rearward movements can not be recognized only with the steering angle sensor and the vehicle wheel speed sensor.

Still further, according to the above-described patent document 1, the turning radius is calculated based upon output from the steering angle sensor, and the pulse counter performs integration and counts the number of pulses outputted from the vehicle wheel sensor, by which the vehicle moving distance can be calculated. However, due to characteristics of the vehicle wheel sensor, integration error may occur or may be increased when the vehicle is more approaching a target position or when the target position is located more distant from a start point.

According to the above-described nonpatent publication 2, it is prerequisite that the two camera positions are fixed at left and right sides and the relative positions and postures are known. The distance toward the object can be calculated by identifying an identical point between images including the object shot by the left and right cameras in accordance with the principle of triangulation. This identification of the identical point between the images are referred to as a stereoscopic correspondence.

On the other hand, when the image processing technology described in the nonpatent publication 6 is referred, the three-dimensional shape of the object or the obstacle can be reconstructed only with a single camera. If this type of image processing technology is properly used by a system for observing surroundings of the movable body such as a vehicle, the above problems can be solved. However, according to a motion stereoscope method by the single camera, the camera position and posture varies in response to the vehicle movement. Accordingly, it requires a method of detecting both of the camera position and posture prior to the vehicle movement and the camera position and posture after the vehicle movement.

In regard to the method of detecting the camera position and posture, the nonpatent publication 4 discloses the method of combining measurements from a yaw rate sensor (a gyro) with measurements from a wheel speed sensor (an encoder). Further, the nonpatent publication 4 reminds that the error of the output from the yaw rate sensor is increased over time due to a time-dependent zero drift of the yaw rate sensor. This nonpatent publication 4 further reminds that it may be difficult to detect the vehicle position and posture because the vehicle wheel speed sensor generally tends to cause a relatively large error. In order to solve the problems, this nonpatent publication 4 suggests calculation of both error components such that the respective errors by the yaw rate sensors and the vehicle speed sensors are restrained so as not to practically affect on the vehicle position and posture detection.

According to the nonpatent publication 5, the calibration between the two images for the identical object is represented by homography H. A flat portion of each image has to contain at least four points in order to determine homography H. In other words, a relative positional relationship between a camera at first and second positions can be calculated if at least four points are contained in the flat portion of each image. That is, the other image can be calculated based upon one image. According to the nonpatent publication 6, the internal and external camera parameters can be calculated by analyzing homography H.

A need thus exists for providing an improved movable body circumstance monitoring apparatus which can high-precisely specify the position and posture of a single image capturing device, i.e., the movable body without causing errors. The improved movable body circumstance monitoring apparatus can assure a view from the movable body at a desired position and can properly display the image of the view.

SUMMARY OF THE INVENTION

According to an aspect of the present invention, a movable body circumstance monitoring apparatus includes at least one means for capturing an image of a surrounding of a movable body depending upon movement of the movable body, means for deriving at least four feature points in a specified flat at the image captured by the at least one means for capturing the image, means for tracking the at least four feature points in response to movement of the movable body from a first state to a second state, and means for specifying moving condition such as relative position and posture of the at least one means for capturing the image at the first and second states in response to first flat coordinates of the feature points at the image captured at the first state and second flat coordinates of the feature points at the image at the second state based upon a tracking result by the means for tracking the at least four feature points.

According to another aspect of the present invention, the movable body circumstance monitoring apparatus further includes means for estimating three-dimensional coordinates of the feature points based upon the relative position and posture of the means for capturing the image at the first and second states specified by the means for specifying the moving condition, the first flat coordinates of the feature points at the image at the first state, and the second flat coordinates of the feature points at the image at the second state.

It is preferable that the movable body circumstance monitoring apparatus further includes means for creating a specific view based upon the three-dimensional coordinates of the feature points estimated by the means for estimating the three-dimensional coordinates, and means for displaying the specific view created by the means for creating the specific view, and means for transmitting a command related to the specified view from a user of the movable body. The means for creating the specific view includes means for changing the specified view in response to the command from the user of the movable body.

It is then preferable that the movable body circumstance monitoring apparatus further includes means for detecting a substance approaching to the surrounding of the movable body based upon information of the image captured by the means for capturing the image. In this case, the means for creating the specific view creates the specific view which includes the substance detected by the means for detecting the substance.

It is still further preferable that the movable body circumstance monitoring apparatus further includes means for estimating a moving track of the movable body based upon information from the means for specifying the moving condition. In this case, the means for creating the specific view includes means for overlapping the moving track estimated by the means for estimating the moving track on the specified view.

The movable body includes a vehicle and a robot, as non-limiting examples.

BRIEF DESCRIPTION OF THE DRAWING FIGURES

The foregoing and additional features and characteristics of the present invention will become more apparent from the following detailed description considered with reference to the accompanying drawing figures, wherein.

Figure 18:
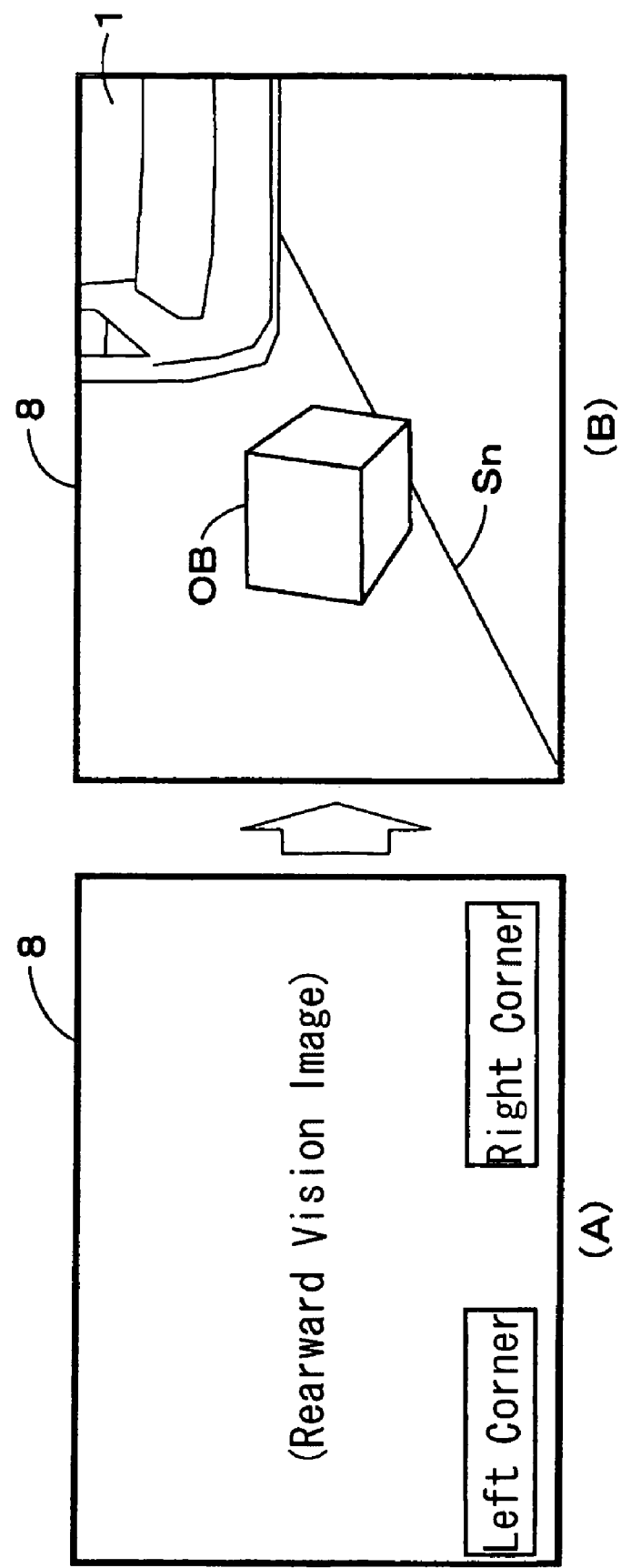
Figure 19:
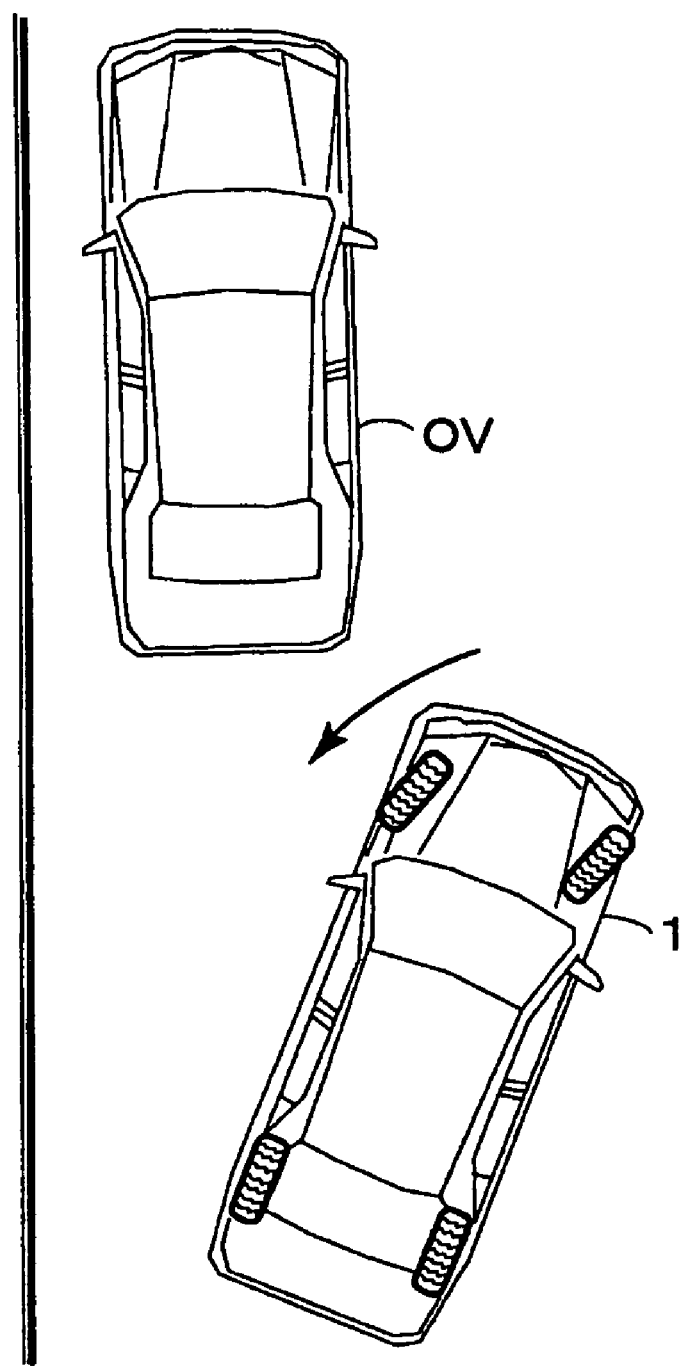
Figure 20:
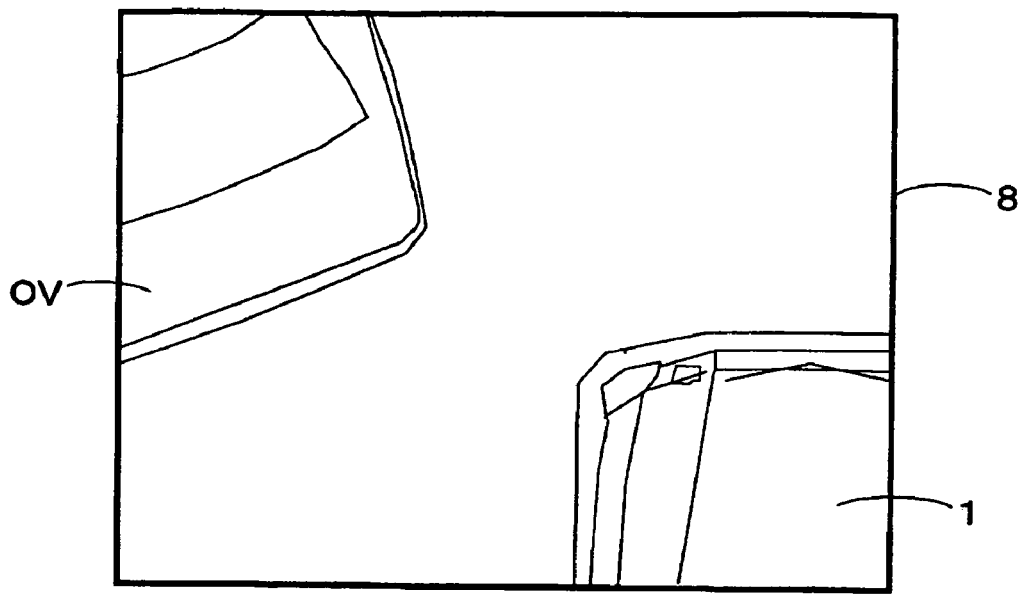
Figure 21:
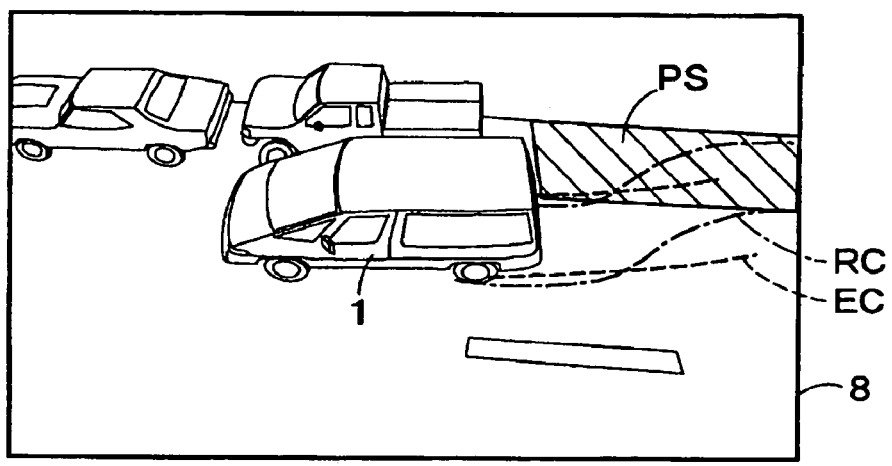
Figure 22:
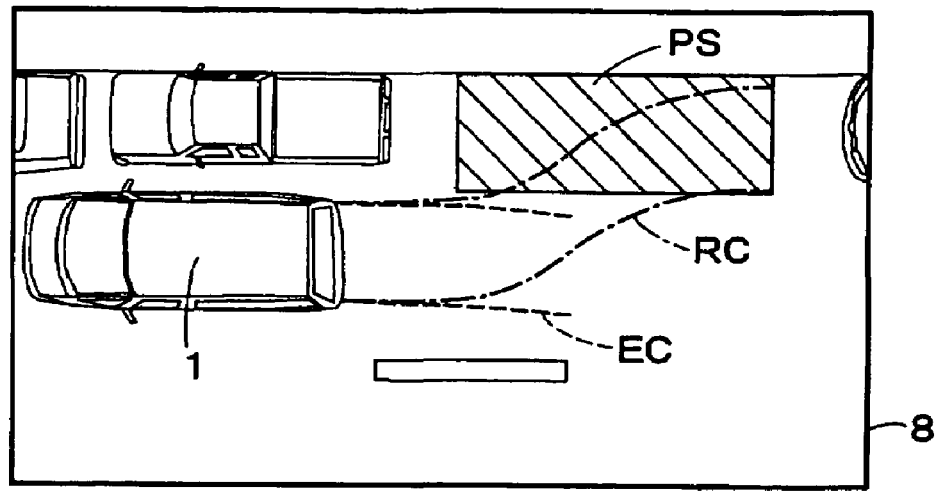
Figure 23:
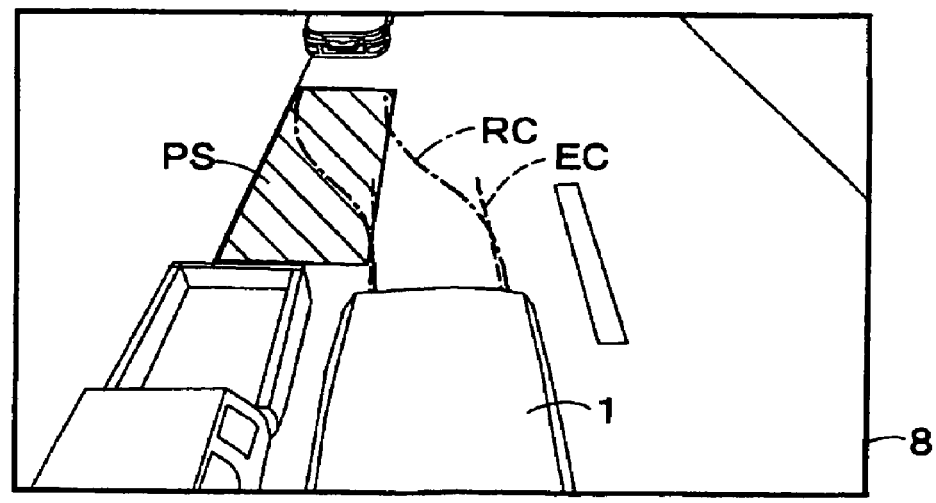

FIGS. 18(A) and (B) are plan views exemplifying a monitor showing a touch panel switch, wherein a screen displayed in the monitor is shifted from a normal displayed screen (A) to a screen (B) which displays a zoomed image;

FIG. 19 is a plan view illustrating an example of movement of the vehicle which is parallel-parked at the left side relative to the vehicle forward moving direction;

FIG. 20 is a plan view illustrating an example of a monitor which displays a virtual image of a front left corner portion of the vehicle when the vehicle is turned in an arrow direction after rearward movement;

FIG. 21 is a plan view from a vehicle upper cross viewpoint, illustrating an example of the vehicle parallel-parking at the right side of the vehicle forward moving direction;

FIG. 22 is a plan view from a vehicle overhead viewpoint, illustrating an example of the vehicle parallel-parking at the right side relative to the vehicle forward moving direction; and FIG. 23 is a plan view from a vehicle front upper viewpoint, illustrating an example of the vehicle parallel-parking at the right side relative to the vehicle forward moving direction

DETAILED DESCRIPTION OF THE INVENTION

Preferred embodiments of the present invention will be described hereinbelow in detail with reference to the accompanying drawings.

Figure 1:
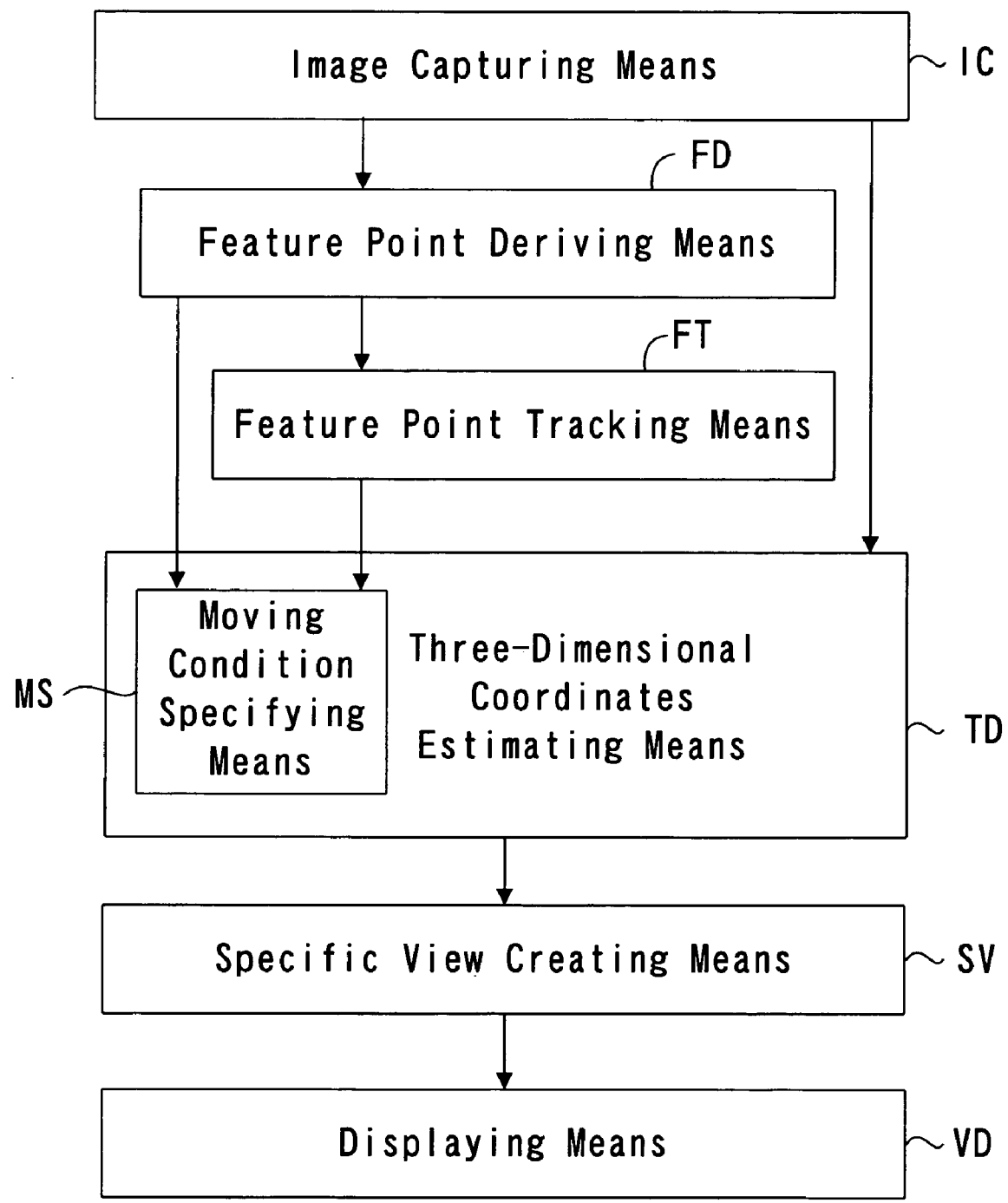
FIG. 1 is a block view illustrating an entire structure of a movable body circumstance monitoring apparatus according to a first embodiment of the present invention.
Figure 5:
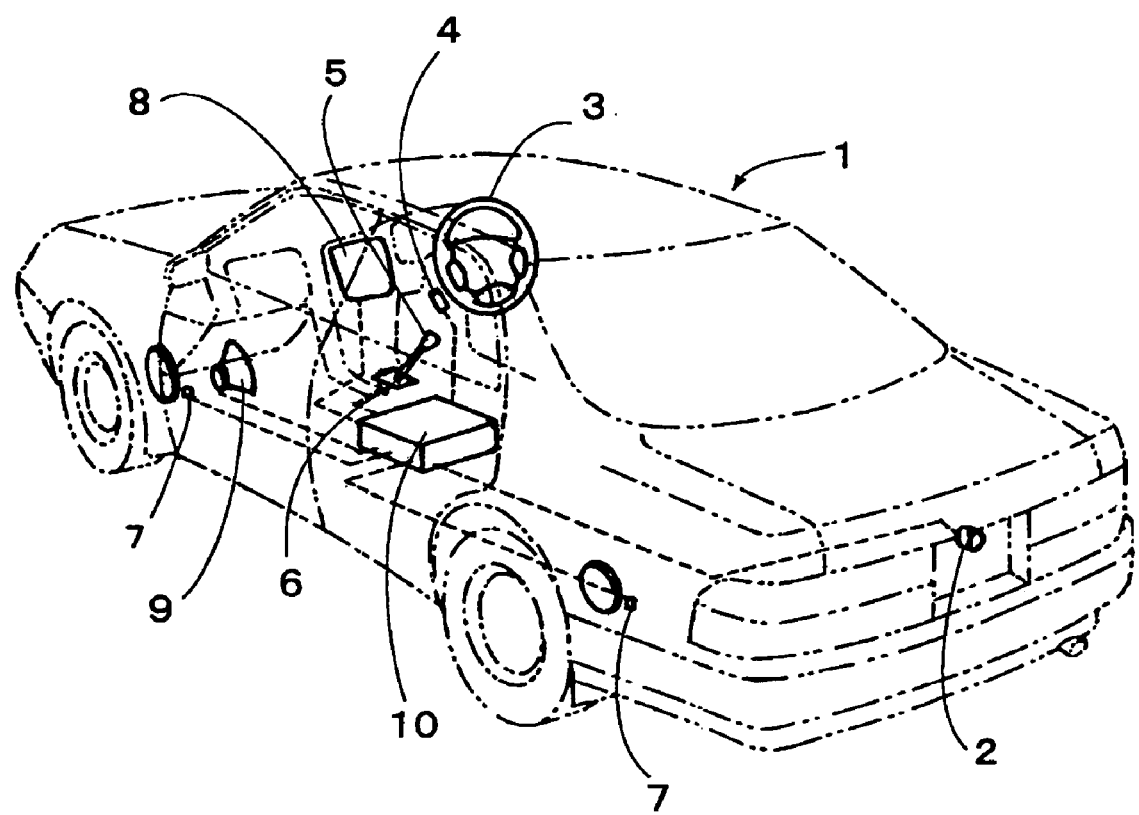
FIG. 5 is a perspective view illustrating an entire structure of a vehicle mounted with the movable body circumstance monitoring apparatus applied for a parking guide system according to the embodiments of the present invention.

As illustrated in FIG. 1, a movable body circumstance monitoring apparatus according to a first embodiment of the present invention can be mounted on a vehicle 1 illustrated in FIG. 5, as a non-limiting example, and can be applied for a parking guide system. The movable body circumstance monitoring apparatus includes at least one image capturing means IC mounted at the movable body such as the vehicle 1 and for capturing an image of circumstance of the movable body during movement of the movable body, feature point deriving means FD for deriving or extracting at least four feature points in a specified flat of the image captured by the image capturing means IC, feature point tracking means FT for tracking the feature point derived by the feature point deriving means FD according to movement of the movable body from a first state to a second state, moving condition specifying means MS for specifying the relative positions and postures of the image capturing means IC at the first and second states in accordance with flat coordinates of the feature point in the image at the first state and flat coordinates of the feature point in the image at the second state based upon the tracking result by the feature point tracking means FT, and three-dimensional coordinates estimating means TD for estimating three-dimensional coordinates of the feature point of a predetermined object based upon the positions and postures of the image capturing means IC at the first and second states, the flat coordinate of the feature point from the image at the first state, and the flat coordinate of the feature point from the image at the second state. Therefore, the movable body circumstance monitoring apparatus can monitor the circumstance of the movable body based upon the feature point of the predetermined object estimated by the three-dimensional coordinates estimating means TD. The movable body according to the embodiments of the present invention can be the vehicle 1 or a robot, as non-limiting examples.

In more details, as illustrated in FIG. 1, the movable body circumstance monitoring apparatus further includes specific view creating means SV for creating a specific view based upon the three-dimensional coordinates of the feature point of the predetermined object, and displaying means VD for displaying the specific view as the image. A user of the movable body or a vehicle driver can monitor the circumstance around the movable body through the displaying means VD. The image capturing means IC is represented by a later described ccd camera, as a non-limiting example. The displaying means VD is represented by a monitor mounted at the movable body, as a non-limiting example. The image displayed by the displaying means VD based on the output from the specific view creating means SV can be constructed with a predetermined image and other images which may have been enlarged, diminished, rotated, shot from a different viewpoint, or the like.

Figure 2:
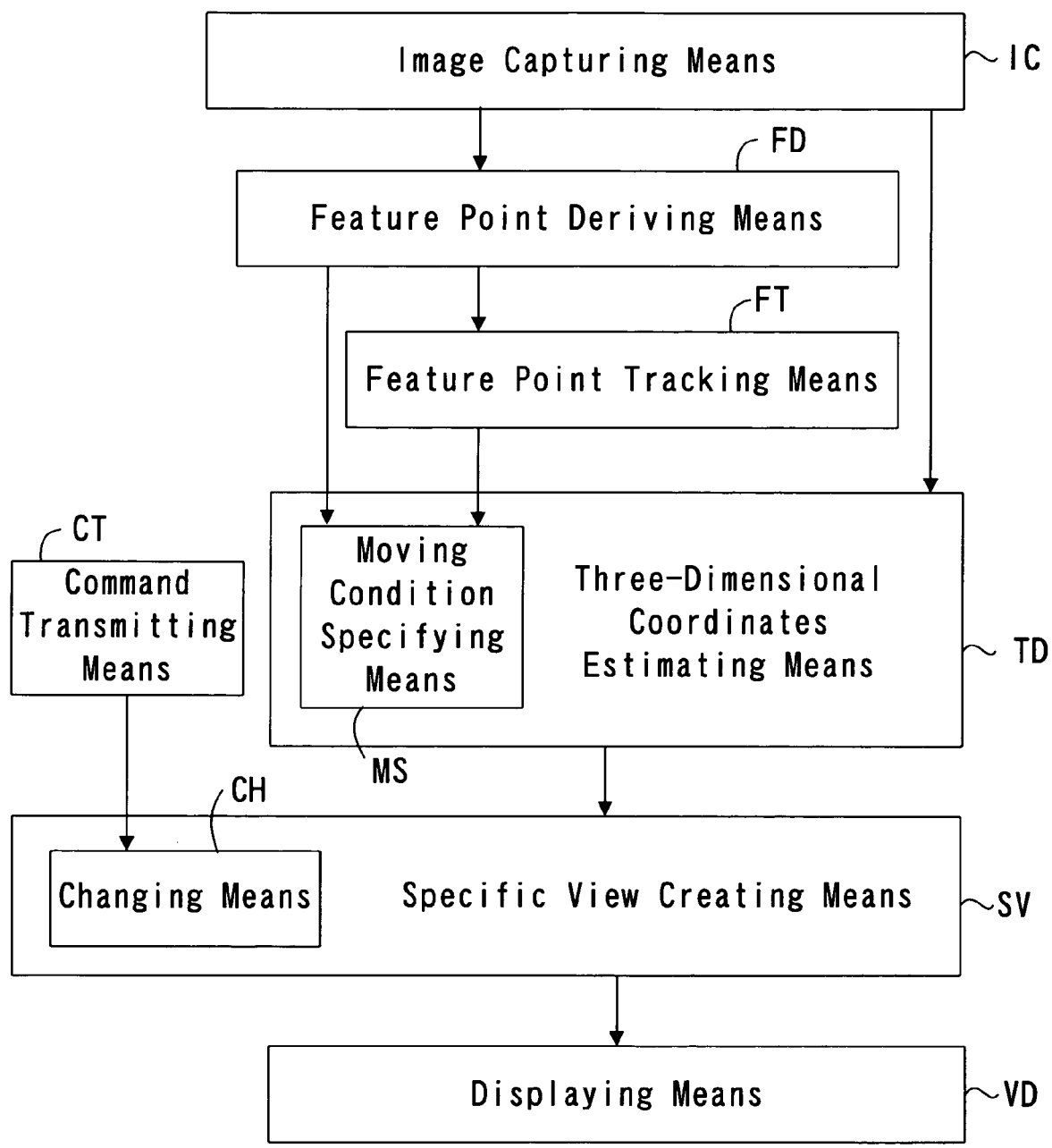
FIG. 2 is a block view illustrating an entire structure of a movable body circumstance monitoring apparatus according to a second embodiment of the present invention.

As illustrated in FIG. 2, the movable body circumstance monitoring apparatus according to a second embodiment of the present invention can be mounted on the vehicle 1 illustrated in FIG. 5, as a non-limiting example, and can be applied for the parking guide system. The movable body circumstance monitoring apparatus according to the second embodiment includes not only the structure according to the first embodiment but also command transmitting means CT for transmitting a command related to the specified view from the user of the movable body such as the driver of the vehicle 1. The specific view creating means SV includes changing means CH for changing the specific view to a view based upon the command from the user. A mechanical switch (not shown) is a type of the command transmitting means CT, as a non-limiting example. When the monitor is applied as the displaying means VD, as a non-limiting example, a touch panel switch on the image of the monitor can be a type of the command transmitting means CT, as a non-limiting example. Further, a voice recognizing device can be a type of the command transmitting means CT, as a non-limiting example.

Figure 3:
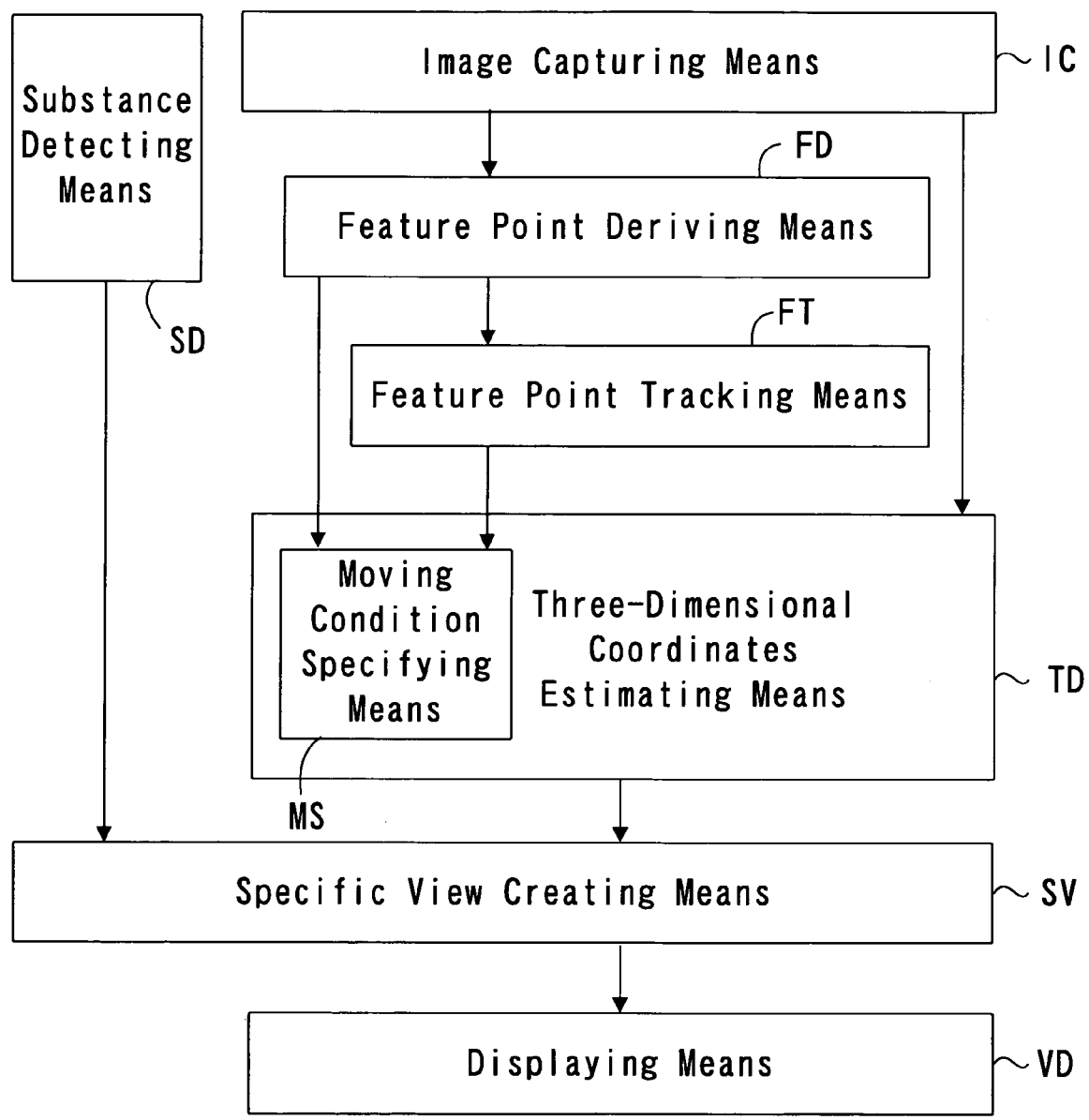
FIG. 3 is a block view illustrating an entire structure of a movable body circumstance monitoring apparatus according to a third embodiment of the present invention.

As illustrated in FIG. 3, the movable body circumstance monitoring apparatus according to a third embodiment of the present invention can be mounted at the vehicle 1 illustrated in FIG. 5, as a non-limiting example, and can be applied for the parking guide system. The movable body circumstance monitoring apparatus according to the third embodiment includes not only the structure according to the first embodiment but also substance detecting means SD for detecting a substance approaching the surroundings of the movable body such as the vehicle 1 based upon information of the image captured by the image capturing means IC. The specific view creating means SV creates the specific view which includes the substance detected by the substance detecting means SD. The substance may be generally an obstacle that should not impact with the movable body. The substance detecting means SD detects the substance relatively approaching the movable body within a predetermined distance based upon the information of the image captured by the image capturing means IC. For example, when the substance detecting means SD detects that there is a substance within a predetermined zone from the movable body, the specific view creating means SV creates the image including the substance. The displaying means DV automatically displays the image including the substance.

Figure 4:
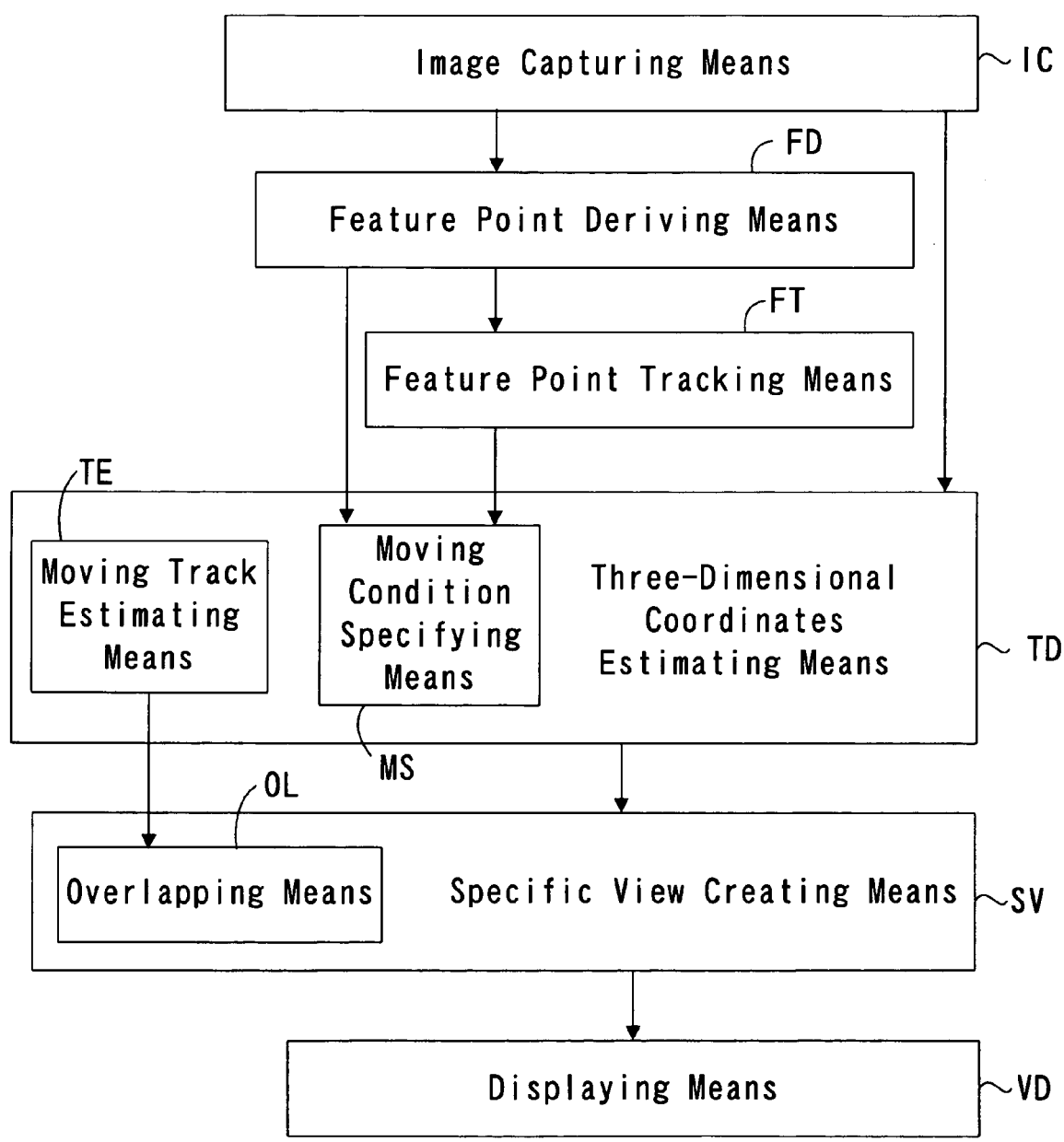
FIG. 4 is a block view illustrating an entire structure of a movable body circumstance monitoring apparatus according to a fourth embodiment of the present invention.

As illustrated in FIG. 4, the movable body circumstance monitoring apparatus according to a fourth embodiment of the present invention can be mounted at the vehicle 1 illustrated in FIG. 5, as a non-limiting example, and can be applied for the parking guide system. The movable body circumstance monitoring apparatus according to the fourth embodiment includes not only the structure according to the first embodiment but also a moving track estimating means TE for estimating a moving track of the movable body such as the vehicle 1 based upon the information specified by the moving condition specifying means MS. The specific view creating means SV includes overlapping means OL for overlapping the moving track estimated by the moving track estimating means TE on the specific views. The displaying means VD displays an image including the estimated moving track overlapping the specific view. An estimated vehicle driving track is a type of the moving track estimated by the moving track estimating means TE, which is described later with reference to FIGS. 21, 22, and 23.

Figure 6:
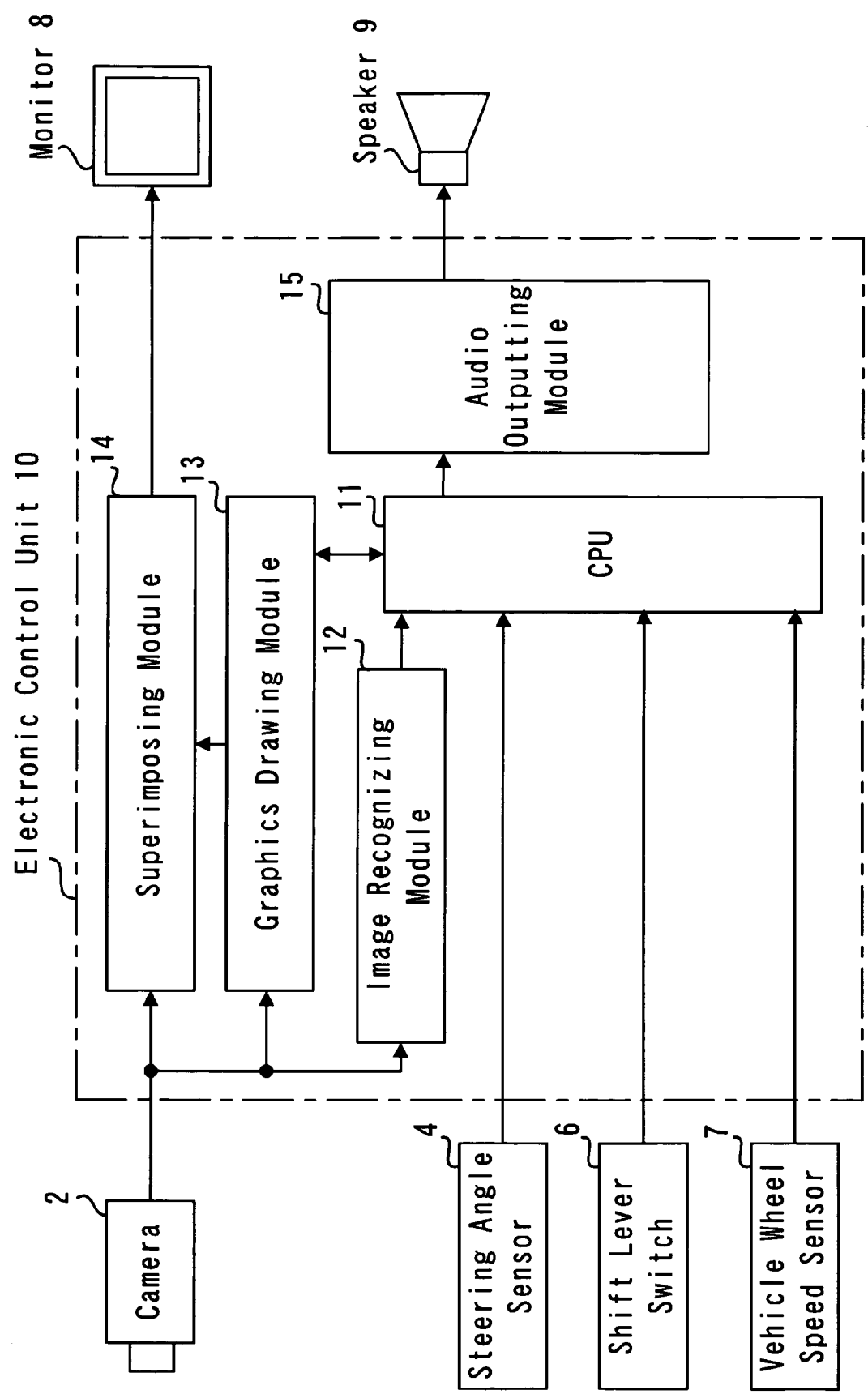
FIG. 6 is a block view illustrating a structure of the parking guide system according to the embodiments of the present invention.

When the movable body corresponds to a vehicle, the movable body circumstance monitoring apparatus according to the embodiments of the present invention can be applied for the parking guide system illustrated in FIGS. 5 and 6. As illustrated in FIG. 5, a camera 2 is a type of the image capturing means IC which is mounted at a rear portion of the vehicle 1, as a non-limiting example, to capture the circumstance around the vehicle 1. The camera 2 may be a ccd camera. The image information by the camera 2 is supplied to an electronic control unit 10.

The electronic control unit 10 is housed in a chassis case mounted on the vehicle 1 illustrated in FIG. 5 and acts as the feature point deriving means FD, the feature point tracking means FT, the moving condition specifying means MS, the three-dimensional coordinates estimating means TD, the specific view creating means SV, the displaying means VD, the changing means CH, the overlapping means OL, and the moving track estimating means TE. A steering angle sensor 4 is disposed in the vehicle 1 so as to detect a steering angle of a steering wheel 3. A shift lever switch 6 is disposed in the vehicle 1, which is turned on when a shift lever 5 is shifted to a reverse stage. The detected steering angle and the on signal are then provided to the electronic control unit 10, respectively. Further, according to the embodiments of the present invention, vehicle wheel speed sensors 7 are mounted on respective vehicle wheels so as to detect rotational speed of the respective corresponding vehicle wheels. The detected vehicle wheel speed is supplied to the electronic control unit 10. A monitor 8 is arranged at a predetermined position in the vehicle 1 and should be easily visible by the driver. The monitor 8 displays visual information for parking guiding in response to output signals from the electronic control unit 10. That is, according to the embodiments of the present invention, the monitor 8 is a type of the displaying means VD as a non-limiting example. Further, a speaker 9 is disposed at a predetermined position in the vehicle 1, thereby enabling to output audio information for parking guiding in response to an output signal from the electronic control unit 10.

As illustrated in FIG. 6, the steering angle sensor 4, the shift lever switch 6, and the vehicle wheel speed sensors 7 are connected to a CPU 11 in the electronic control unit 10 via an input interface (not shown). The monitor 8 is connected to a superimposing module 14 in the electronic control unit 10 via an output interface (not shown). The speaker 9 is connected to the CPU 11 via an audio outputting module 15. The camera 2 is connected to an image recognizing module 12, a graphics drawing module 13, and the superimposing module 14 via the input interface. The CPU 11, the image recognizing module 12, the graphics drawing module 13, the superimposing module 14, and the audio outputting module 15 are mutually connected by bus bars. Information in each module is stored for a predetermined period of time and can be read out when needed.

A signal of the image of the environment surrounding the vehicle 1 shot by the camera 2 is supplied to the CPU 11 via the image recognizing module 12. The signal outputted from the vehicle wheel seed sensors 7 and so on are also supplied to the CPU 11 for the calculation. The graphics drawing module 13 draws a three-dimensional graphic in response to a synchronization signal derived from the image shot by the camera 2 based upon the calculated result at the CPU 11. In the meantime, calculation is performed by the CPU 11 for the purpose of the parking assistance. A graphic based upon the calculation result is drawn by the graphics drawing module 13. The graphic drawn by the graphics drawing module 13 and the image shot by the camera 2 are superposed by the superposing module 14 when needed and are displayed in the window screen of the monitor 8. In this case, it is possible to set that the only graphic image can be displayed without displaying a camera shot image.

As described above, the feature point deriving means FD, the feature point tracking means FT, the moving condition specifying means MS, the three-dimensional coordinates estimating means TD, and the specific view creating means SV are configured with the CPU 11, the image recognizing module 12, and the graphic drawing module 13. The feature point deriving means FD derives at least four feature points in the specific flat from the image captured by the camera 2 which is a type of the image capturing means CD. The feature point tracking means FT tracks the four feature points derived by the feature point deriving means FD in accordance with movement of the movable body from the first state to the second state. The moving condition specifying means MS specifies the relative positions and postures of the camera 2 or the vehicle 1 at the first and second states in response to the flat coordinates of the four feature points at the first state and the flat coordinates of the four feature points at the second state based upon the result by the feature point tracking means FT.

Figure 7:
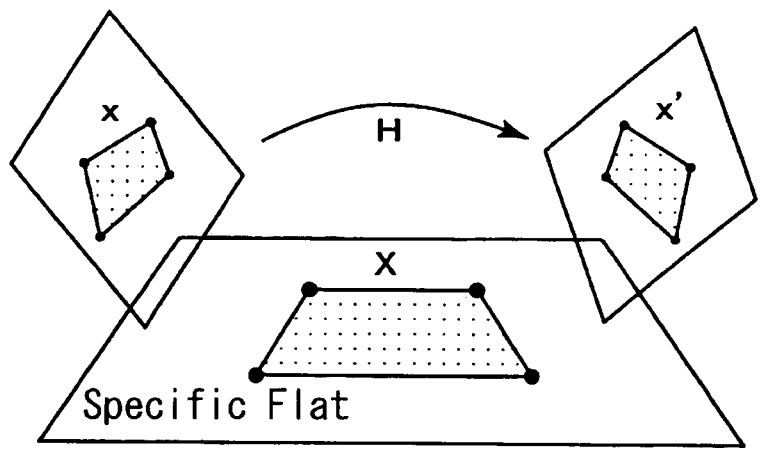
FIG. 7 is an explanatory view for explaining a geometric relationship for calculating homography H by deriving at least four feature points in specific flats at images captured at first and second camera positions by a single camera.

As illustrated in FIG. 7, while the movable body is moving, at least four points are derived in the specific flat such as in the road surface, as a non-limiting example, which is included in an image V1 captured by the camera 2 at the first state, i.e., at a first camera position. As time goes on, the four feature points derived at the first camera position are tracked in an image V2 captured at a second state wherein the four feature points in the specific flat are in view, i.e., at a second camera position. Extraction and tracking the feature points are described later on with reference to FIG. 9. As described above, at least four feature points in the specific view can be derived or extracted from the images captured at the two positions. Further, homography H can be calculated because each feature point corresponds between the two images.

Homography H can derive relative camera external parameters between the two camera positions such as the first and second states. That is, camera internal parameters such as scale factor, and optical axis position coordinates, and camera external parameters, such as camera location can be calculated based upon homography matrix, i.e., perspective projection matrix. Description of this matter will be omitted herein because the nonpatent publication 6 describes it therein. Pursuant to this procedure, the relative positions and postures at the first and second states can be calculated. The position includes translation elements (tx, ty, tz) corresponding to each axis on coordinates (X, Y, Z). The posture includes rotation element (r1, r2, r3) corresponding to each axis on coordinates (X, Y, Z). Both of the translation elements and the rotation elements create vectors T and R that are described later with reference to FIG. 8.

When the vehicle 1 illustrated in FIG. 5 moved from the first state to the second state, coordinates of the feature points are detected from the image captured by the camera 2 at the first state. In connection with the detection, the feature point tracking means FT detects coordinates corresponding to the feature points from the image at the second state. According to the embodiments of the present invention, the feature points to be derived can be each pattern of a road surface crack, a gravel stone, an edge of a curb stone, and so on. As explained above, there are lots of objects to be considered as a feature point. Therefore, as far as at least four feature points can be detected at an identical road surface, it can be enough that each feature point is detected only at two different viewpoints.

As described above, the moving condition specifying means MS can specify the moving condition of the camera 2, and further can specify the moving condition of the movable body such as the vehicle 1 as a non-limiting example. Specifically, the relative positions and postures of the vehicle 1 at a position prior to the movement and at a position after the movement can be accurately detected by referring to at least four spots in a view or in a scenery, which can be represented for example by a white line on a road surface, a shadow of an object, a road edge, and concave and convex portions. Further, each referred spot can be shifted to a next spot in accordance with the movement of the vehicle 1. Hence, according to the embodiments of the present invention, conventionally caused errors relative to an initial state can be restrained from being accumulated or can be effectively prevented. Further, according to the embodiments of the present invention, the position and posture of the vehicle 1 can be detected by the movable body circumstance monitoring apparatus with the above-described structure. Alternatively, the apparatus can be utilized with the vehicle wheel speed sensors 7, the steering angle sensor 4, and a yaw rate sensor (not shown) as non-limiting examples.

According to a conventional method of estimating vehicle position and posture by use of a steering angle sensor and a vehicle wheel speed sensor, errors have been accumulated and increased in proportion that the vehicle moves distant from the initial point. However, according to the embodiments of the present invention, the feature point is detected based upon the information of the image captured by the camera 2, i.e., by the image capturing means IC. The image information may include a substance such as a white line in the specific flat such as a road surface or a wall surface, concave and convex portions, steps, and patterns, and a point on a profile line of a road pattern such as stains, and shadows. That is, the feature point can be detected based upon the aforementioned landmarks. Further, the vehicle 1 approaches a target position while deriving a new feature point in accordance with the vehicle movement by turns, wherein errors upon computing the position and posture of the movable body such as the vehicle 1 can be effectively reduced.

The three-dimensional coordinates estimating means TD estimates three-dimensional coordinates of the feature point of a predetermined object based upon the camera position and posture at the first and second states specified by the moving condition specifying means MS, flat coordinates of the feature point of the predetermined object in the image shot at the first state, and flat coordinates of the feature point of the predetermined object in the image shot at the second state. The predetermined object can be a portion of an image such as another vehicle, or an entire image.

Figure 8:
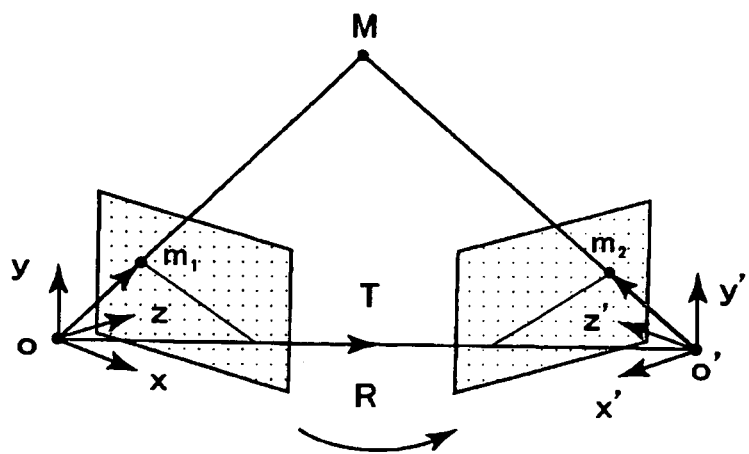
FIG. 8 is an explanatory view for explaining a geometric relationship for capturing feature points of a substance in a space by two cameras.

The above-described reconstruction of the three-dimensional shape is carried out based upon the principle of triangulation by use of images as disclosed in the aforementioned nonpatent publication 2, and are described hereinafter with reference to FIGS. 8 and 9. As illustrated in FIG. 8, when observing an identical point M in the space at least from two camera positions, as shown with references o and o' at the left and right sides in FIG. 8, points $m_1$ and $m_2$ are observed in the respective images shot at the first and second camera positions. A first optical ray can be defined, which connects the optical center of the image at the first camera position. A second optical ray can be defined, which connects the optical center of the image at the second camera position. An intersecting point of both first and second optical rays represents the point M in the space. In this case, the three-dimensional point M in a scene of interest needs to be identified between the images. When the three-dimensional shape is reconstructed by use of a single camera, it is necessary to extract the feature points of an object of interest in the image and to track those feature points. The camera internal parameter, e.g., a scale factor, and optical axis position coordinates, can be measured in advance. However, as described above, the camera external parameter, e.g., the camera position, can be derived from the homography H calculated based upon deriving and tracking the feature points. Alternatively, the camera internal parameters can be derived from the homography H.

In order to reconstruct the three-dimensional shape depending on the shift of the scene of interest, the method of stereo correspondence can be applied to determine at which position and posture of the camera each time-serial image was photographed, as far as the correspondences have been calibrated by a dead-reckoning system. However, it is necessary to identify the corresponding point in the time-serial images which are shot by the camera so as to contain the identical point, thereby enabling to reconstruct the three-dimensional shape in the scene of interest.

Extraction of the feature point in the scene of interest can be carried out by extracting some feature points which characterize the object in the scene of interest. The feature points in this case correspond to points possessing appropriate characteristics that are acceptable along with the processing sequence of the image. The feature point can be derived by using an automatic correlation by a matrix A(x, y):

$$A(x, y) = \begin{bmatrix} \sum_W (I_x(x_k, y_k))^2 & \sum_W (I_x(x_k, y_k) I_y(x_k, y_k)) \\ \sum_W (I_x(x_k, y_k) I_y(x_k, y_k)) & \sum_W (I_y(x_k, y_k))^2 \end{bmatrix}. \quad (1)$$

I(x, y) shows a function of the image, $I_x$ shows a gradient of the image along an x-axis, $I_y$ shows a gradient of the image along a y-axis, and ($x_k$, $y_k$) shows an image point in the window W having (x, y) as a centre of the image. The matrix A(x, y) functions to average derivatives of the image signal included in the window region W containing a point p(x, y) in the image. Thus, an optimal feature point can be obtained by using the matrix A. That is, the feature point suitable to be tracked generally corresponds to a corner or an intersecting point of lines. The matrix A can derive this sort of feature point.

Next, an Image sequence I(u, t) having coordinates of an image point at $u=[x, y]^T$ is considered for feature tracking. The brightness of the image is presumed not to be changed after elapsing a minute time when a sample cycle is sufficiently short. In this case, the following equation can be found:

$$I(u,t)=I(\delta(u),t+\tau). \quad (2)$$

With the formula (2), δ(u) represents a motion field, i.e., projection of a three-dimensional motion vector to the image. Because the sample cycle is sufficiently short, the motion can be approximated using only a translation element, therefore δ(u)=u+d, where the translation element "d" represents a displacement vector.

In order to calculate the displacement vector d relative to each selected feature point and each tracked pair of points in the image sequence, a tracker is applied. In practice, because the motion model of the image cannot be recovered perfectly due to the influence of the noise, the above formula (2) does not function sufficiently. Accordingly, the displacement vector d may be calculated by a sum of square difference:

$$\varepsilon = \sum_W [I(u+d, t+\tau) - I(u, t)]^2. \quad (3)$$

The displacement vector d, which minimizes a residual of the formula 3, is then obtained and the feature points are tracked in the direction of the displacement vector d. "W" of the formula (3) represents a window for deriving the feature points centering on the point u.

Figure 9:
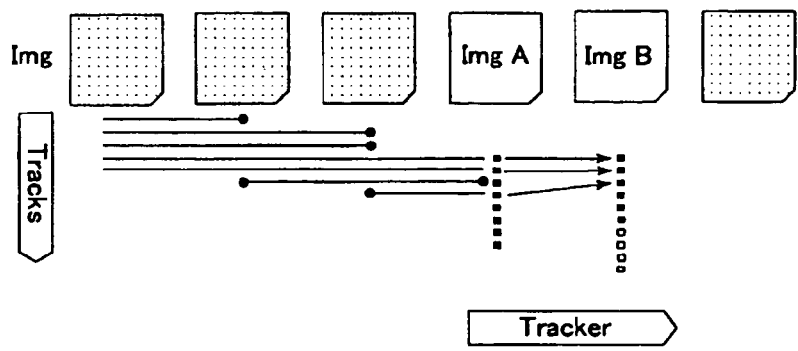
FIG. 9 is an explanatory view for explaining an example of tracking to reconstruct a three-dimensional shape according to the embodiments of the present invention.

As illustrated in FIG. 9, a tracks is a set of points characterising an identical object among the image sequences. Image points of each track correspond to projections of respective three-dimensional points. Although the tracks of an image sequence should not be lost, the tracking has to be stopped when the tracking points cannot be derived because the points to be tracked are out of the image or are hidden. Hereinafter, starting from a set of the feature points derived in a first image, the feature points of the previous image, i.e., Img A in FIG. 9, are tracked in the next image, i.e., Img B in FIG. 9. In case that some of the feature points in the Img A are not tracked in the Img B, new feature points are searched in the Img B and the new feature points are referred to as starting points for the tracking thereafter.

When a distance between the position M and the camera position in the three-dimensional space is z, a formula (4) is obtained assuming the projection position at m in the image:

$$M = \frac{Z}{f}m, M = Zm. \quad (4)$$

With the formula (4), a distance f is referred to as a focal length. Hereinafter, the distance f is defined with a unit length at 1 so as to simplify the formula 5. In the foregoing manner, a geometric relation for capturing the feature point in the space, such as a peak point of an object, by use of two cameras can be described as illustrated in FIG. 8.

As illustrated in FIG. 8, the second camera coordinates can be produced by giving rotation matrix R and translation vector T to the first camera coordinates with a central focus on the original viewpoint o. The first camera coordinates are at the left side in FIG. 8, and the second camera coordinates are at the right side in FIG. 8. The translation vector T is referred to as a baseline vector. The parameters {T, R} depict a relative positional and postural relationship between these two camera viewpoints. Therefore, when the object is photographed by a single camera, the camera movement such as translation and rotation can be measured by the dead reckoning system.

Further, as illustrated in FIG. 8, the projections of the position M in the three-dimensional space are assumed to be positioned at the coordinates $m_1$ and $m_2$ in each image. The direction of the feature point from the viewpoint o' of the second camera coordinates can be depicted with a vector $m_2$ with respect to the second camera coordinates. However, the second camera coordinates were produced by giving rotation matrix R to the first camera coordinate system. Therefore, the direction of the feature point from the viewpoint o' can be depicted with $Rm_2$ with respect to the first camera coordinates, wherein a formula (5) is obtained:

$$Zm_1 = T + Z'Rm_2. \quad (5)$$

The Z and Z' in the formula (5) are calculated in accordance with a formula (6):

$$Z = \frac{(T \times Rm_2, m \times Rm_2)}{\|m_1 \times Rm_2\|^2}, \quad Z' = \frac{(T \times m_1, m_1 \times Rm_2)}{\|m_1 \times Rm_2\|^2}. \quad (6)$$

As described above, the distances Z and Z' in the three-dimensional space can be reconstructed depending on the coordinates $m_1$ and $m_2$ of the projections onto the respective images from the two different camera viewpoints. The aforementioned track is the set of points in the objective view. Therefore, the three-dimensional shape can be reconstructed based upon the calculation in accordance with the formula (6) regarding all tracks.

As described above, the substance existing in the image captured zone can be specified based upon the position and posture of the vehicle 1, i.e. the position and posture of the camera 2 at the first and second states, and based upon the corresponding points between the images, which are specified by deriving and tracking the feature points in the respective images. Accordingly, the three-dimensional coordinates can be estimated in each image-capturing zone.

Figure 10:
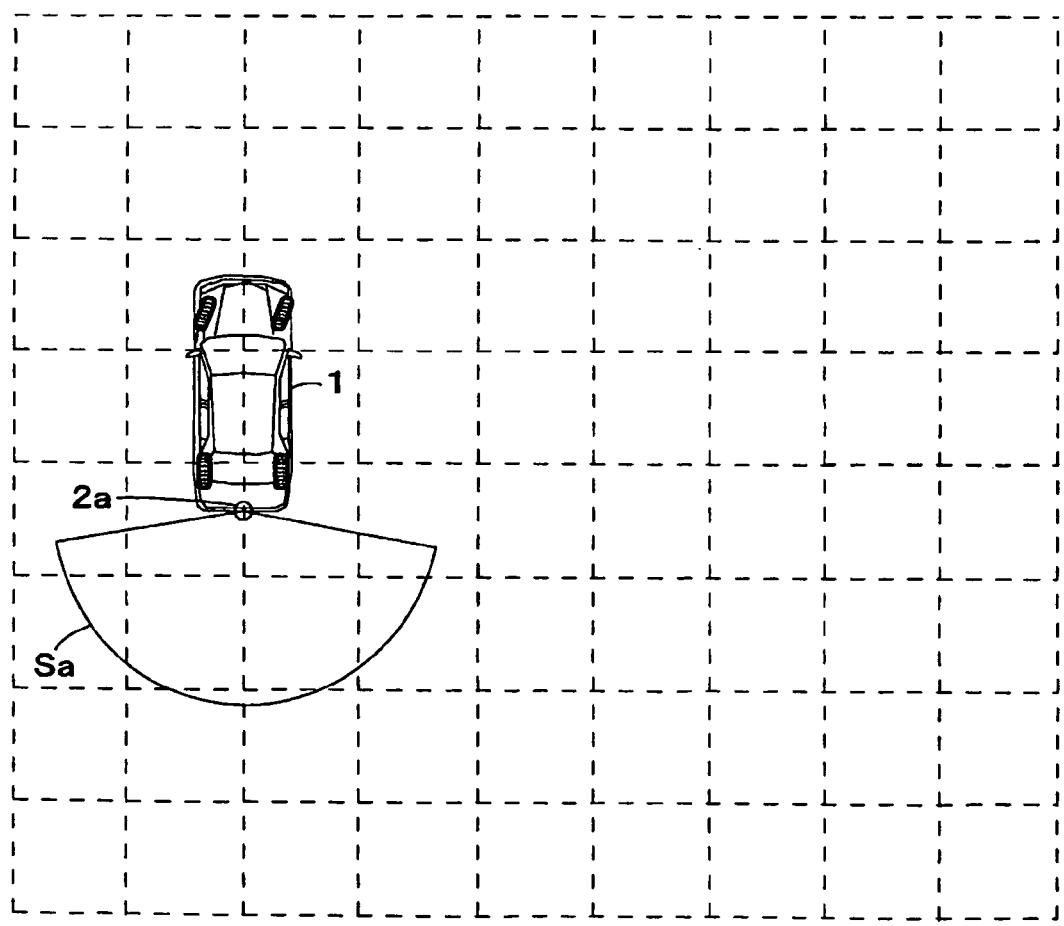
FIG. 10 is a plan view illustrating a displayed view shot by a virtual camera arranged at a rear portion of a vehicle according to the embodiments of the present invention.

The specified view is created by the specified view creating means SV when a camera is assumed to have been oriented in a predetermined direction on the vehicle 1 positioned at a predetermined point in the third-dimensional environment containing the environment around the vehicle 1. An image of the view shot by this virtual camera is displayed in the monitor 8 as the displaying means VD. FIG. 10 shows which region is contained in a view shot by this virtual camera 2a in accordance with the third-dimensional map with the vehicle 1 after moving. The virtual camera 2a is assumed to have been located at a rearward portion of the vehicle 1. In other words, a region denoted with Sa in FIG. 10 is contained in the view shot by the virtual camera 2a and is displayed as a virtual image in the monitor 8. Hereinafter, the region displayed in the monitor 8 is referred to as a displayed view.

Figure 11:
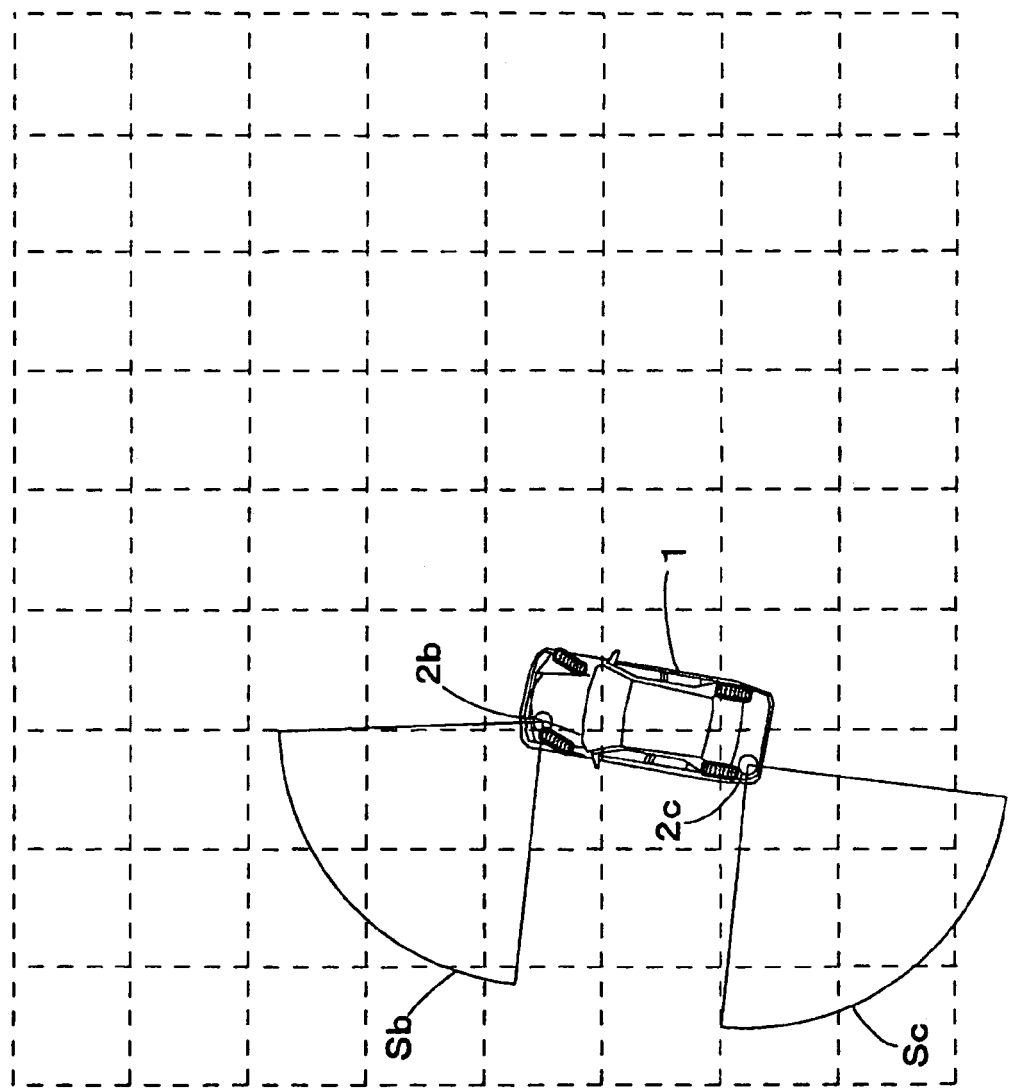
FIG. 11 is a plan view illustrating a displayed view shot by virtual cameras respectively arranged at a front left corner of the vehicle and at a rear left corner thereof according to the embodiments of the present invention.

FIG. 11 shows displayed views Sb and Sc contained in views shot by a virtual camera 2b mounted at a front left corner of the vehicle 1 and by a virtual camera 2c mounted at a rear left corner thereof in accordance with the third dimensional map with the vehicle 1 after moving. In the same manner, FIG. 12 shows a displayed view Sd contained in a view shot by a virtual camera 2d, which was located at a side portion of the vehicle 1, in accordance with the third-dimensional map with the vehicle 1 after moving.

Figure 12:
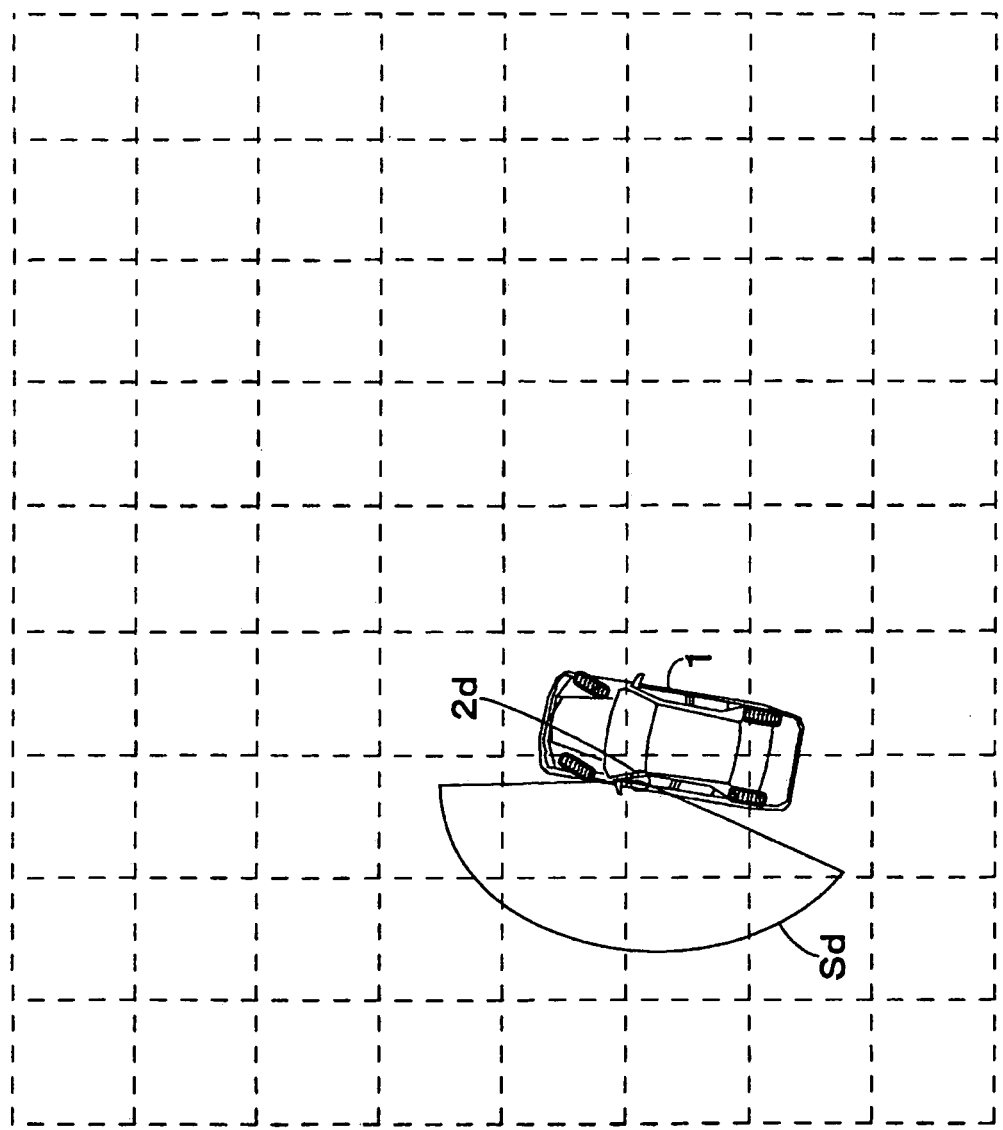
FIG. 12 is a plan view illustrating a displayed view shot by a virtual camera arranged at a side portion of the vehicle according to the embodiments of the present invention.
Figure 13:
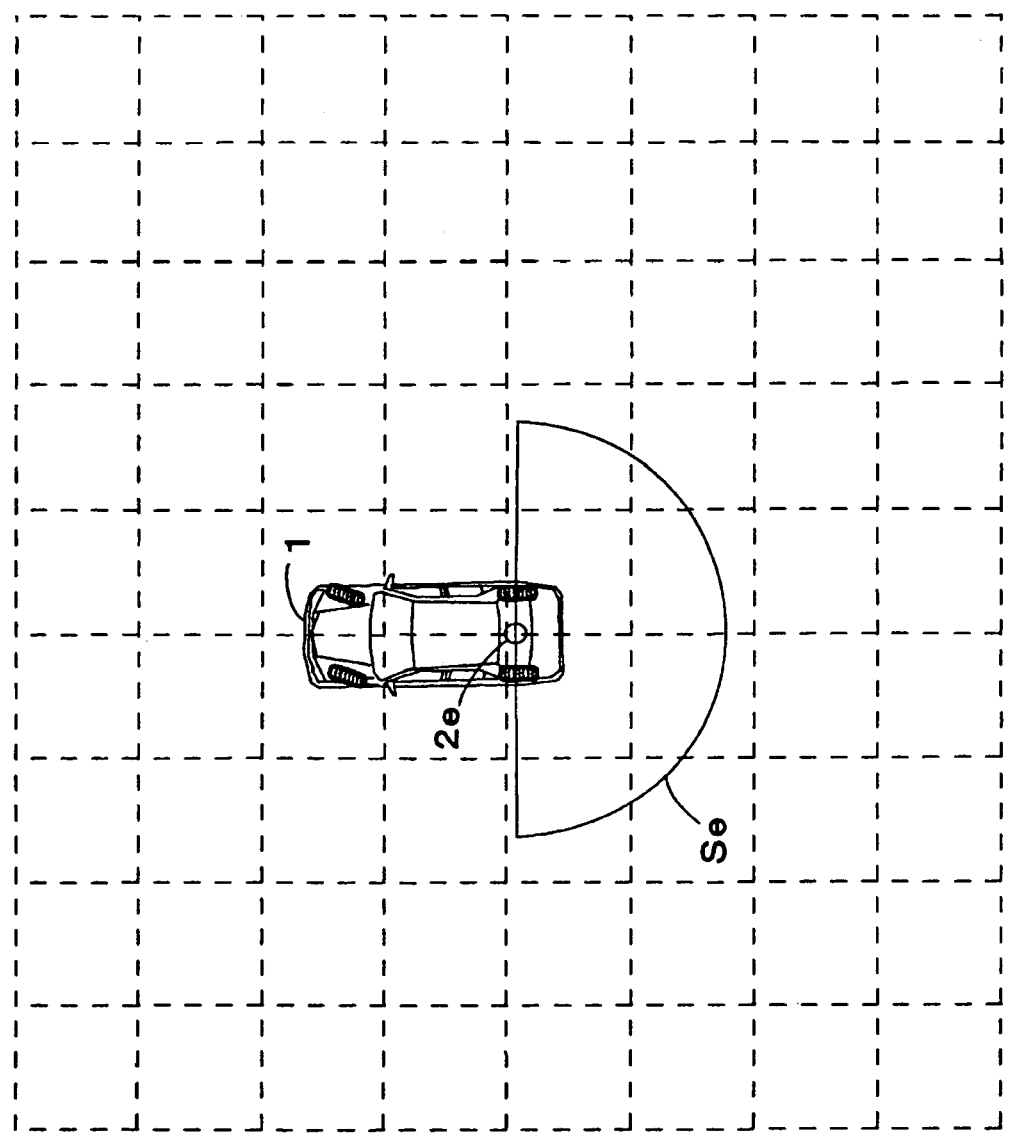
FIG. 13 is a plan view illustrating a displayed view at 180 degrees shot by a virtual camera arranged at an upper rear portion of the vehicle according to the embodiments of the present invention.
Figure 14:
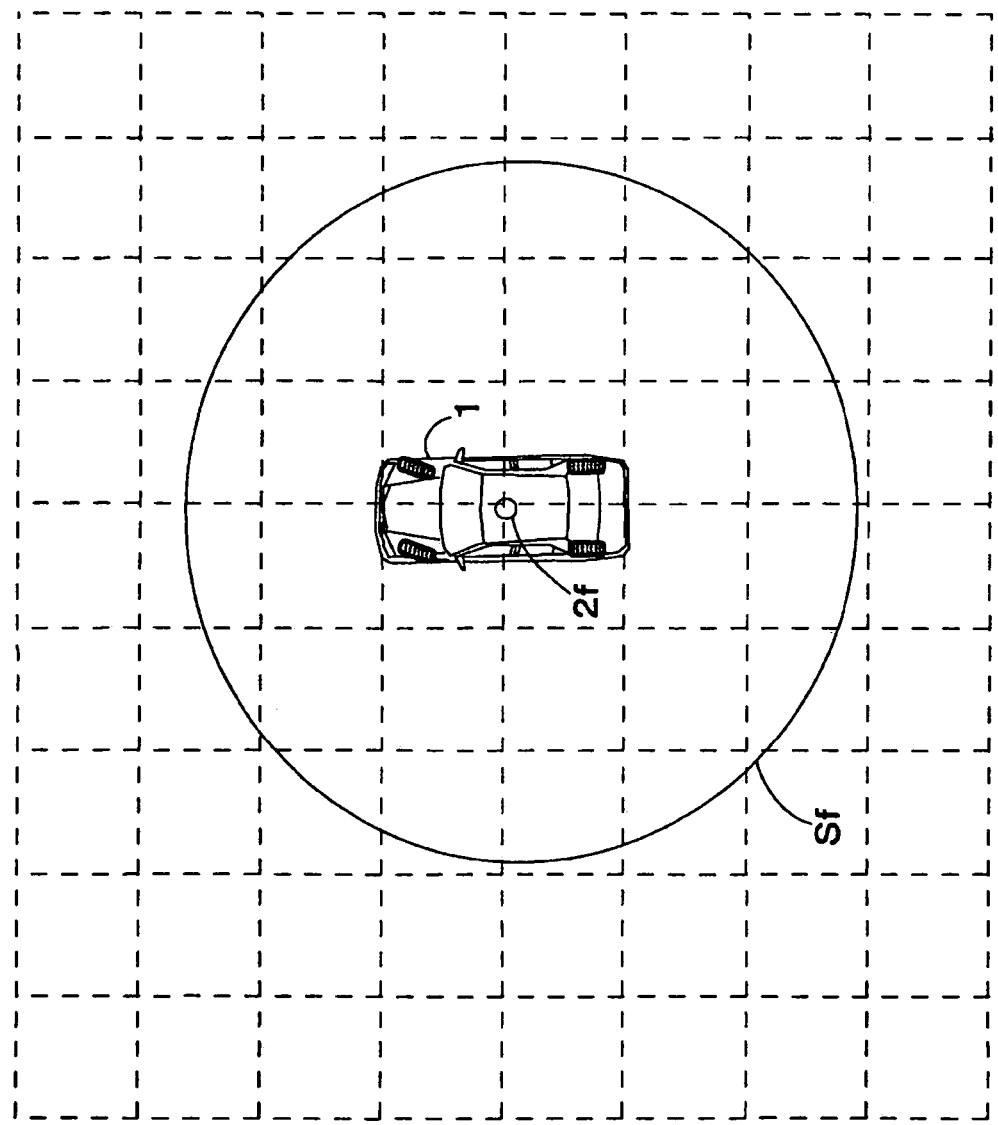
FIG. 14 is a plan view illustrating a displayed view at 360 degrees shot by a virtual camera arranged above the vehicle according to the embodiments of the present invention.

The angles photographed by the virtual cameras illustrated in FIGS. 10, 11, and 12 are designed to be substantially similar to the angle shot by the actual camera 2. Alternatively, as illustrated in FIG. 13, a virtual camera 2e can be mounted at the vehicle 1 so as to set a displayed view Se at 180 degrees. Therefore, the monitor 8 can display a virtual image which also contains views around the left and right corners which can not be shot by the actual camera 2. Further, as illustrated in FIG. 14, a virtual camera 2f can be mounted above the vehicle 1 so as to set a displayed view Sf at 360 degrees. The monitor 8 can display a virtual image containing this view shot by the virtual camera 2f.

Figure 15:
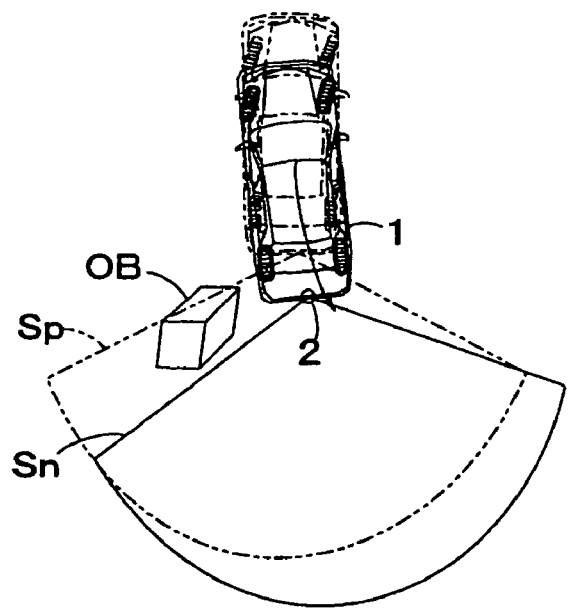
FIG. 15 is a plan view exemplifying how the displayed view varies in response to rearward movement of the vehicle according to the embodiments of the present invention.

The above-described virtual image varies depending on the movement of the vehicle 1, i.e. depending on shifting of the view in response to the movement of the virtual cameras. According to the embodiment of the present invention, the monitor 8 can display a virtual image containing the obstacle captured during the vehicle movement when needed. For example, as illustrated in FIG. 15, when the vehicle 1 only with the back camera 2 is located at a position denoted with double dashed lines, the obstacle OB appears in a region Sp denoted with double dashed lines, wherein the monitor 8 displays an image containing the obstacle OB. Once the vehicle 1 is moved from the aforementioned position in an arrow direction down to a position denoted with a solid line, the obstacle OB disappears in a region Sn denoted with a solid line, wherein the displayed image in the monitor 8 does not contain the obstacle OB. In response to further movement of the vehicle 1 in the arrow direction from the position denoted with the solid line, the obstacle OB approaches to a portion between the rear left corner of the vehicle 1 and the front left thereof. In this case, the obstacle OB deviates from a view which can be displayed by the monitor 8.

Figure 16:
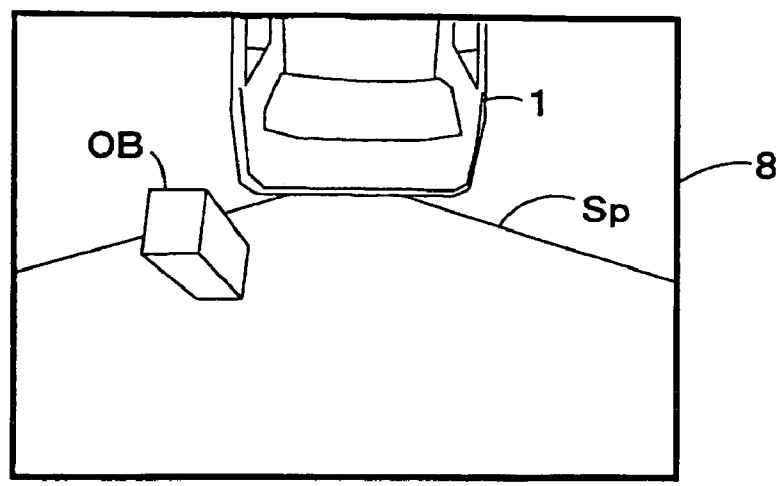
FIG. 16 is a plan view exemplifying an image showing a rear portion of the vehicle at a position denoted with double dashed lines in FIG. 15 and an obstacle around the vehicle.
Figure 17:
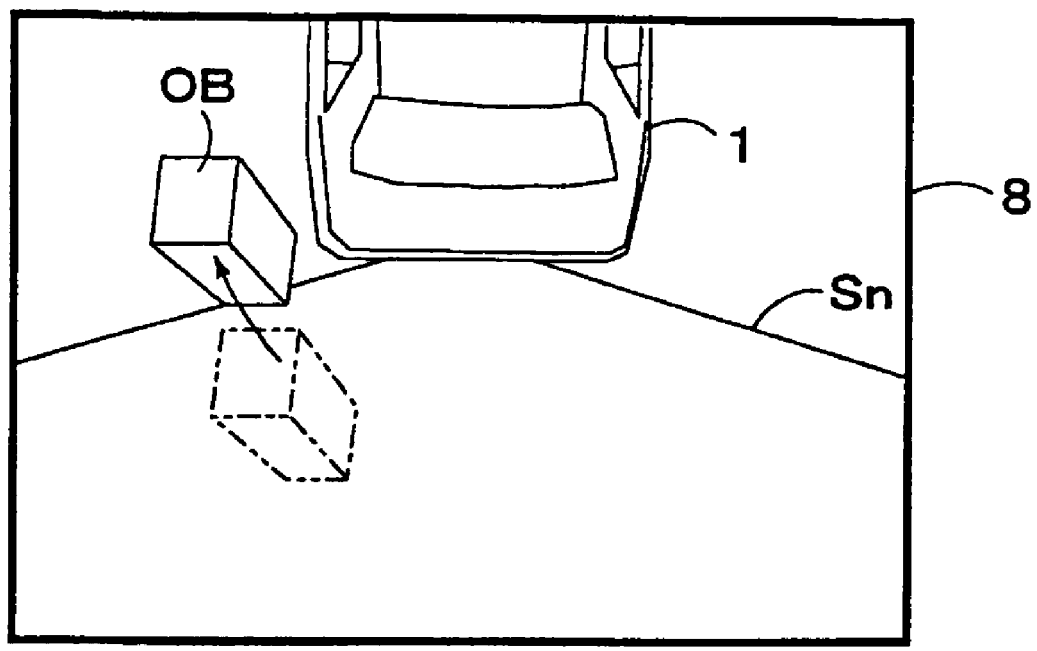
FIG. 17 is a plan view exemplifying an image showing a rear portion of the vehicle at a position denoted with a solid line in FIG. 15 and the obstacle around the vehicle.

Under the above-described condition between the vehicle 1 and the obstacle OB, if the virtual view shot by the virtual camera 2e above the vehicle 1 is displayed in the monitor 8, the displayed image can contain both corners of the vehicle 1 as illustrated in FIGS. 16 and 17. As illustrated in FIG. 17, a relative position of the obstacle OB to the vehicle 1 is shifted in an arrow direction illustrated in FIG. 17 from the position denoted with the double dashed lines. The obstacle OB is then illustrated with a solid line. As described above, even if the obstacle OB deviates from an actual view shot by the actual camera 2, the driver can recognize the position of the obstacle OB through the screen of the monitor 8.

According to the embodiments of the present invention, the displayed image in the monitor 8 can be switched from the image shot by the actual camera 2 to the virtual images illustrated in FIGS. 16 and 17, by the command transmitting means CT and the changing means CH. More particularly, as illustrated in FIG. 15, the monitor 8 possesses a displayed screen (A) which shows not only the image (not shown) of the rear view of the vehicle 1 but also touch panel switches indicating "Left corner" and "Right corner". For example, when the driver or user touches the touch panel switch indicating "Left corner" shown in the displayed screen (A), the displayed screen (A) is switched to a screen (B) which zooms the left corner of the vehicle 1 in the virtual image. In this case, the driver can easily recognize the obstacle OB approaching to the left corner of the vehicle 1. As described above, it is preferable that the portion of the vehicle 1 is zoomed in the monitor 8 as the driver intends. Alternatively, the display illustrated in FIG. 16 can be moved from side to side or can be auditorily warned about the obstacle OB approaching to the vehicle 1.

As described above, the obstacle OB around the vehicle 1 has been recognized in a three-dimensional manner. Therefore, when the obstacle OB approaching close to the vehicle 1 deviates from the view actually captured by the camera 2, the monitor 8 can automatically display a view beyond the view captured by the camera 2 as a virtual image. For example, as illustrated in FIG. 19, when the vehicle 1 is parallel-parked at the left side of the road, the vehicle 1 is turned in a direction denoted with an arrow after moving rearward. In this case, there is possibility that a front left corner of the vehicle 1 may impact with a rear portion of the other vehicle OV. As illustrated in FIG. 3, when the substance detecting means SD is provided, the vehicle OV can be recognized as a substance or an obstacle approaching the vehicle 1 within a predetermined distance. The specific view creating means SV creates a vehicle containing the vehicle OV. Accordingly, the front left corner of the vehicle 1 can be displayed as a virtual image in the motor 8, as illustrated in FIG. 20.

As illustrated in FIG. 19, when the vehicle 1 is moved rearward after moving forward for the parallel-parking behind the vehicle OV, the information of the environmen-containing the vehicle OV captured by the camera 2 has been stored as a three-dimensional environment map. When a distance between the front left corner of the vehicle 1 and the rear portion of the vehicle OV is judged to be less than a predetermined distance, the monitor 8 automatically displays the virtual image illustrated in FIG. 20. In this case, the driver or the user of the movable body can be auditorily guided at the same time. Further, when the electronic control unit 10 judges that the vehicle 1 may impact with the vehicle OV, the monitor 8 can display some warning therein. In this case, the driver or the user can be alerted about the possible impact not only the screen of the monitor 8 but also with a sound. Alternatively, the image displayed in the monitor 8 can be switched to a view having a virtual image containing the obstacle. In this case, the driver or the user can be alerted about the possible impact not only the screen of the monitor 8 but also with a sound.

Further, as illustrated in FIG. 4, the movable body circumstance monitoring apparatus includes the moving track estimating means TE for estimating the moving track of the movable body based upon the information specified by the moving condition specifying means MC, and the overlapping means OL included in the specific view creating means SV and for overlapping the estimated moving track on the specified view. As illustrated in FIGS. 21, 22, and 23, when the vehicle 1 is parallel-parked along the right side of the road, a virtual image can be displayed by overlapping a recommended course RC for the parallel-parking and an estimated moving course EC of the vehicle 1. According to the fourth embodiment of the present invention, the moving track of the movable body can be estimated by the moving track estimating means TE. Alternatively, the estimated moving course EC of the vehicle 1 can be calculated based upon the vehicle information such as the steering angle detected by the steering angle sensor 4 illustrated in FIG. 5. The estimated course EC can be calculated in a conventional manner such that the description thereof will be omitted herein.

FIG. 21 is an air view illustrating a virtual image of the vehicle 1 shot from an upper-cross viewpoint. FIG. 22 is an aerial view illustrating a virtual image of the vehicle 1 from the overhead. FIG. 23 is an aerial view illustrating a virtual image of the vehicle 1 shot from a front upper viewpoint of the vehicle 1 in a direction of the rearward portion of the vehicle 1. The vehicle 1 is intended to be parked at a parking space PS. As described above, the information of the environment around the vehicle 1 shot by the camera 2 has been memorized as a three-dimensional environment map until the vehicle 1 is moved rearward after the forward movement illustrated in FIGS. 21, 22, and 23. Therefore, the virtual images illustrated in FIGS. 21, 22, and 23 can be displayed in the monitor 8, when needed.

As described above, according to each embodiment of the present invention, each virtual image can be displayed in the monitor 8 even if the movable body such as the movable body is provided with only the single camera 2. Therefore, the image capturing means IC such as a camera does not have to be mounted at a portion, such as a vehicle corner portion, which is generally difficult to be provided in terms of technical or designing matters. Further, a desired virtual image can be displayed in the monitor 8 based upon the information of the environment around the vehicle 1 which was shot by the camera 2. The driver hence can be properly guided through the monitor 8 regardless of the mounting position and orientation of the camera 2. Therefore, the image capturing means IC is not limited to the camera 2 mounted at the rear portion of the vehicle 1 as illustrated in FIG. 5, can be represented by a side camera, a front camera, as non-limiting examples.

As described above, according to the embodiments of the present invention, the position and posture of the image capturing means, i.e. the movable body can be detected by recognizing the images. Therefore, the position and posture of the movable body can be specified only by a single image capturing means, e.g., by a single camera, with high precision, thereby enabling to restrain or avoiding errors. Further, the image capturing means can capture an image when the movable body is located at a desired position. Therefore, the monitor can properly display the image therein.

The principles, preferred embodiments and mode of operation of the present invention have been described in the foregoing specification and drawings. However, the invention which is intended to be protected is not to be construed as limited to the particular embodiment disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A movable body circumstance monitoring apparatus comprising:
   at least one means for capturing an image of a surrounding of a movable body depending upon movement of the movable body;
   means for deriving at least four feature points in a specified flat at the image captured by the at least one means for capturing the image;
   means for tracking the at least four feature points in response to movement of the movable body from a first state to a second state; and
   means for specifying a moving condition including relative position and posture of the at least one means for capturing the image at the first and second states in response to first flat coordinates of the feature points at the image captured at the first state and second flat coordinates of the feature points at the image at the second state based upon a tracking result by the means for tracking the at least four feature points, the specified flat having the four feature points being at least one of a road surface and a wall surface, the feature points being derived from at least one of a white line, a concave portion, a convex portion, a step, a pattern, a surface crack, an edge, a point on a profile line of a pattern, a shadow of an object on at least one of the road surface and the wall surface, a gravel stone and an edge of a curb stone on the road surface.

2. A movable body circumstance monitoring apparatus according to claim 1, further comprising:
means for estimating three-dimensional coordinates of the feature points based upon the relative position and posture of the means for capturing the image at the first and second states specified by the means for specifying the moving condition, the first flat coordinates of the feature points at the image at the first state, and the second flat coordinates of the feature points at the image at the second state.

3. A movable body circumstance monitoring apparatus according to claim 2, further comprising:
means for creating a specific view based upon the three-dimensional coordinates of the feature points estimated by the means for estimating the three-dimensional coordinates; and
means for displaying the specific view created by the means for creating the specific view; and
means for transmitting a command related to the specified view from a user of the movable body, and
the means for creating the specific view comprising:
means for changing the specified view in response to the command from the user of the movable body.

4. A movable body circumstance monitoring apparatus according to claim 2, further comprising:
means for creating a specific view based upon the three-dimensional coordinates of the feature points estimated by the means for estimating the three-dimensional coordinates;
means for displaying the specific view created by the means for creating the specific view; and
means for detecting a substance approaching to the surrounding of the movable body based upon information of the image captured by the means for capturing the image, wherein the means for creating the specific view creates the specific view which includes the substance detected by the means for detecting the substance.

5. A movable body circumstance monitoring apparatus according to claim 2 further comprising:
means for creating a specific view based upon the three-dimensional coordinates of the feature points estimated by the means for estimating the three-dimensional coordinates;
means for displaying the specific view created by the means for creating the specific view; and
means for estimating a moving track of the movable body based upon information from the means for specifying the moving condition, and
the means for creating the specific view comprising:
means for overlapping the moving track estimated by the means for estimating the moving track on the specified view.

6. A movable body circumstance monitoring apparatus according to claim 1, wherein the movable body includes a vehicle and a robot.

7. A movable body circumstance monitoring apparatus comprising:
at least one camera mounted at a movable body and configured to capture an image of a surrounding of a movable body depending upon movement of the movable body; and
an electronic control unit supplied with information of the image captured by the at least one camera, wherein position of the posture of the movable body can be specified;
wherein the electronic control unit is configured to derive at least four feature points in a specified flat at the image captured by the at least one camera, tracks the at least four feature points in response to movement of the movable body from a first state to a second state, and specifies moving condition such as relative position and posture of the at least one camera at the first and second states in response to first flat coordinates of the feature points at the image captured at the first state and second flat coordinates of the feature points at the image at the second state based upon a tracking result;
the specified flat having the four feature points being at least one of a road surface and a wall surface, the feature points being derived from at least one of a white line, a concave portion, a convex portion, a step, a pattern, a surface crack, an edge, a point on a profile line of a pattern, a shadow of an object on at least one of the road surface and the wall surface, a gravel stone and an edge of a curb stone on the road surface.

8. A movable body circumstance monitoring apparatus according to claim 7, further comprising:
a monitor being visible from a user of the movable body and configured to display the image captured by the camera and a three-dimensional graphic; and
the electronic control unit comprising:
a central processing unit;
an image recognizing module connected to the central processing unit and configured to recognize a signal of the image captured by the camera;
a graphic drawing module connected to the central processing unit and configured to draw a three-dimensional graphic; and
a superimposing module connected to the graphic drawing module and configured to superimpose the three-dimensional graphic drawn by the graphic drawing module on the image captured by the camera.

9. A movable body circumstance monitoring apparatus according to claim 8, wherein the electronic control unit further estimates three-dimensional coordinates of the feature points based upon the relative position and posture of the camera at the first and second states, the first flat coordinates of the feature points at the image at the first state, and the second flat coordinates of the feature points at the image at the second state.

10. A movable body circumstance monitoring apparatus according to claim 9, wherein the electronic control unit further creates a specific view based upon the estimated three-dimensional coordinates of the feature points, and the monitor displays the created specific view, the movable body circumstance monitoring apparatus further comprising:
a member configured to transmit a command related to the specified view from a user of the movable body to the electronic control unit, wherein the specific view is changed in response to the command from the user of the movable body.

11. A movable body circumstance monitoring apparatus according to claim 10, wherein the member includes a mechanical switch and a touch panel portion at the monitor screen.

12. A movable body circumstance monitoring apparatus according to claim 9, wherein the electronic control unit further detects a substance approaching the surrounding of the movable body based upon information of the image captured by the camera, and creates a specific view, which includes the detected substance, based upon the estimated three-dimensional coordinates of the feature points, and the monitor displays the created specific view.

13. A movable body circumstance monitoring apparatus according to claim 9, wherein the electronic control unit further estimates a moving track of the movable body, and overlaps the estimated moving track on the specific view, and the monitor displays an image in which the estimated moving track overlaps the specific view.

14. A movable body circumstance monitoring apparatus comprising:
- at least one means for capturing an image of a surrounding of a movable body depending upon movement of the movable body;
- means for deriving at least four feature points in a specified flat at the image captured by the at least one means for capturing the image;
- means for tracking the at least four feature points in response to movement of the movable body from a first state to a second state; and
- means for specifying a moving condition including relative position and posture of the at least one means for capturing the image at the first and second states in response to first flat coordinates of the feature points at the image captured at the first state and second flat coordinates of the feature points at the image at the second state based solely upon a tracking result by the means for tracking the at least four feature points.

* * * * *